(12) United States Patent
Wang et al.

(10) Patent No.: US 12,197,055 B2
(45) Date of Patent: Jan. 14, 2025

(54) DIMMABLE PANEL AND DISPLAY DEVICE

(71) Applicants: Hefei BOE Optoelectronics Technology Co., Ltd., Anhui (CN); BOE Technology Group Co., Ltd., Beijing (CN)

(72) Inventors: Yijun Wang, Beijing (CN); Yuansheng Zang, Beijing (CN); Sheng Wang, Beijing (CN); Hui Wang, Beijing (CN); Jian Xu, Beijing (CN); Jie Yang, Beijing (CN); Ru Zhou, Beijing (CN); Xufei Xu, Beijing (CN); Xingkui Guo, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,849

(22) PCT Filed: Feb. 28, 2022

(86) PCT No.: PCT/CN2022/078394
§ 371 (c)(1),
(2) Date: Jan. 18, 2023

(87) PCT Pub. No.: WO2023/159596
PCT Pub. Date: Aug. 31, 2023

(65) Prior Publication Data
US 2024/0248334 A1 Jul. 25, 2024

(51) Int. Cl.
G02F 1/13 (2006.01)
G02F 1/1333 (2006.01)
G02F 1/1343 (2006.01)

(52) U.S. Cl.
CPC ...... *G02F 1/1323* (2013.01); *G02F 1/133388* (2021.01); *G02F 1/134309* (2013.01)

(58) Field of Classification Search
CPC ......... G02F 1/134309; G02F 1/133388; G02F 1/1323
See application file for complete search history.

(56) References Cited

U.S. PATENT DOCUMENTS

| 10,649,248 B1 | 5/2020 | Fan Jiang et al. |
| 2008/0218459 A1* | 9/2008 | Kim ........................ G09G 3/003 345/87 |

(Continued)

FOREIGN PATENT DOCUMENTS

| CN | 1696777 A | 11/2005 |
| CN | 103365002 A | 10/2013 |

(Continued)

*Primary Examiner* — Mariam Qureshi
(74) *Attorney, Agent, or Firm* — IPro, PLLC

(57) ABSTRACT

Disclosed are a dimmable panel (001) and a display device. The dimmable panel includes a first substrate (101) and a second substrate (102) that are arranged opposite each other; a first electrode (103) and a second electrode (104) that are insulated from each other and located between the first substrate (101) and the second substrate (102), where the first electrode (103) and the second electrode (104) are located in a dimmable area (AA), at least one of the first electrode (103) and the second electrode (104) includes a plurality of strip-shaped electrodes, extension trends of all the strip-shaped electrodes are approximately the same, and orthographic projections of the strip-shaped electrodes on the first substrate (101) do not overlap each other; and a liquid crystal layer (105) located between the first substrate (101) and the second substrate (102), where the liquid crystal layer (105) is located in the dimmable area (AA).

15 Claims, 16 Drawing Sheets

(56) References Cited

U.S. PATENT DOCUMENTS

| | | | |
|---|---|---|---|
| 2014/0063386 A1* | 3/2014 | Yang | G02F 1/13306 349/33 |
| 2014/0184964 A1* | 7/2014 | Byeon | G02F 1/134309 349/138 |
| 2014/0191933 A1 | 7/2014 | Fan et al. | |
| 2019/0018278 A1 | 1/2019 | Wang et al. | |
| 2020/0310172 A1 | 10/2020 | Li et al. | |
| 2021/0271132 A1* | 9/2021 | Chiu | G02F 1/133528 |

FOREIGN PATENT DOCUMENTS

| | | | |
|---|---|---|---|
| CN | 103913905 | A | 7/2014 |
| CN | 106707578 | A | 5/2017 |
| CN | 106773179 | A | 5/2017 |
| CN | 110764322 | A | 2/2020 |
| CN | 111679461 | A | 9/2020 |
| CN | 112099261 | A | 12/2020 |
| CN | 213023865 | U | 4/2021 |
| CN | 112987350 | A | 6/2021 |
| WO | 2021021171 | A1 | 2/2021 |

\* cited by examiner

DIMMABLE PANEL AND DISPLAY DEVICE

CROSS-REFERENCE TO RELATED APPLICATIONS

The disclosure is a National Stage of International Application No. PCT/CN2022/078394, filed on Feb. 28, 2022, which is hereby incorporated by reference in their entireties.

FIELD

The present disclosure relates to the technical field of display, and particularly relates to a dimmable panel and a display device.

BACKGROUND

Nowadays, there are increasing types of display devices, such as a desktop computer, a notebook computer, a mobile phone, and an e-reader. Such display-type consumer electronics have been playing an influential role in people's work and life. "Information leakage" (e.g., leakage of commercial technical secrets, and leakage of passwords for bank automatic teller machines (ATMs) or payment accounts of mobile terminals) caused by "visual invasion" during working in public offices has gradually attracted people's attention. Therefore, a demand for peep-proof screens has grown accordingly.

SUMMARY

Embodiments of the present disclosure provide a dimmable panel and a display device.

A specific solution is as follows.

In an aspect, an embodiment of the present disclosure provides a dimmable panel. The dimmable panel has a dimmable area and includes:
- a first substrate and a second substrate which are arranged opposite each other;
- a first electrode and a second electrode which are insulated from each other and located between the first substrate and the second substrate, where the first electrode and the second electrode are located in the dimmable area, at least one of the first electrode and the second electrode includes a plurality of strip-shaped electrodes, extension trends of the plurality of strip-shaped electrodes are approximately the same, and orthographic projections of the plurality of strip-shaped electrodes on the first substrate do not overlap each other; and
- a liquid crystal layer located between the first substrate and the second substrate, where the liquid crystal layer is located in the dimmable area.

In some embodiments, in the dimmable panel provided in the embodiments of the present disclosure, the first electrode includes a plurality of first strip-shaped electrodes, the second electrode includes a plurality of second strip-shaped electrodes, and orthographic projections of the second strip-shaped electrodes on the first substrate and orthographic projections of the first strip-shaped electrodes on the first substrate are arranged alternately.

In some embodiments, in the dimmable panel provided in the embodiments of the present disclosure, shapes of the first strip-shaped electrodes are approximately the same as those of the second strip-shaped electrodes.

In some embodiments, in the dimmable panel provided in the embodiments of the present disclosure, the first electrode includes a plurality of first strip-shaped electrodes, and the second electrode is a planar electrode.

In some embodiments, in the dimmable panel provided in the embodiments of the present disclosure, the first strip-shaped electrodes extend in a bent manner.

In some embodiments, in the dimmable panel provided in the embodiments of the present disclosure, each of the first strip-shaped electrodes includes a plurality of sub-electrodes connected in sequence, and the sub-electrodes are S-shaped and/or zigzag.

In some embodiments, in the dimmable panel provided in the embodiments of the present disclosure, the first strip-shaped electrodes extend in a straight line.

In some embodiments, the dimmable panel provided in the embodiments of the present disclosure further includes a peripheral area surrounding the dimmable area, where a first lead and a second lead are arranged in the peripheral area, the first lead is electrically connected to at least one end of each of the first strip-shaped electrodes, and the second lead is electrically connected to at least one end of each of the second strip-shaped electrodes.

In some embodiments, in the dimmable panel provided in the embodiments of the present disclosure, the peripheral area includes a first peripheral area for bonding a circuit board, and the first peripheral area is located at one side of the first strip-shaped electrodes in an arrangement direction; and
- the first lead is electrically connected to an end, close to the first peripheral area, of each of the first strip-shaped electrodes; and the second lead is electrically connected to an end, away from the first peripheral area, of each of the second strip-shaped electrodes.

In some embodiments, in the dimmable panel provided in the embodiments of the present disclosure, the first lead is electrically connected to two ends of each first strip-shaped electrode, and the second lead is electrically connected to two ends of each second strip-shaped electrode.

In some embodiments, in the dimmable panel provided in the embodiments of the present disclosure, the first electrode and the second electrode are arranged in the same layer on the first substrate.

In some embodiments, in the dimmable panel provided in the embodiments of the present disclosure, the first lead and the second lead are arranged in the same layer, and the first lead and the second lead are located between a layer where the first electrode is located and the first substrate;
- the dimmable panel further includes a first insulation layer between the layer where the first electrode is located and a layer where the first lead is located, the first insulation layer includes a first via hole and a second via hole that are located in the peripheral area, an orthographic projection of the first via hole on the first substrate is located in an orthographic projection of the first lead on the first substrate, and the first lead is electrically connected to the first strip-shaped electrodes via the first via hole; and an orthographic projection of the second via hole on the first substrate is located in an orthographic projection of the second lead on the first substrate, and the second lead is electrically connected to the second strip-shaped electrodes via the second via hole.

In some embodiments, in the dimmable panel provided in the embodiments of the present disclosure, the first electrode is located at one side, facing the second substrate, of the first substrate; and a layer where the second electrode is located is located between the layer where the first electrode is located and the first substrate.

In some embodiments, in the dimmable panel provided in the embodiments of the present disclosure, the first electrode is located at one side, facing the second substrate, of the first substrate; and the second electrode is located at one side, facing the first substrate, of the second substrate.

In some embodiments, in the dimmable panel provided in the embodiments of the present disclosure, the first lead is located between a layer where the first electrode is located and the first substrate, and the first lead is in contact and electric connection with the first strip-shaped electrodes; and the second lead is located between a layer where the second electrode is located and the second substrate, and the second lead is in contact and electric connection with the second strip-shaped electrodes.

In some embodiments, the dimmable panel provided in the embodiments of the present disclosure further includes a first resistance reduction line and a second resistance reduction line that are located in the peripheral area, where the first resistance reduction line and the first electrode are integrally arranged in the same layer, and the second resistance reduction line and the second electrode are integrally arranged in the same layer.

In some embodiments, the dimmable panel provided in the embodiments of the present disclosure further includes a peripheral area surrounding the dimmable area, where a first lead and a second lead are arranged in the peripheral area, the first lead is electrically connected to at least one end of each of the first strip-shaped electrodes, and the second lead is electrically connected to the second electrode.

In some embodiments, in the dimmable panel provided in the embodiments of the present disclosure, the first lead and the first strip-shaped electrodes are integrally arranged, and the second lead and the second electrode are integrally arranged.

In some embodiments, in the dimmable panel provided in the embodiments of the present disclosure, the first lead and the second lead are arranged in the same layer, and the first lead and the second lead are located between the layer where the second electrode is located and the first substrate; and the dimmable panel further includes a second insulation layer between a layer where the first electrode is located and the layer where the second electrode is located, the second insulation layer includes a third via hole located in the peripheral area, an orthographic projection of the third via hole on the first substrate is located in an orthographic projection of the first lead on the first substrate, the first lead is electrically connected to the first strip-shaped electrodes via the third via hole, and the second lead is in contact and electric connection with the second electrode.

In some embodiments, in the dimmable panel provided in the embodiments of the present disclosure, the peripheral area includes the first peripheral area for bonding the circuit board, and a first terminal and a second terminal are arranged in the first peripheral area, where the first terminal is connected to the first lead and the circuit board, the second terminal is connected to the second lead and the circuit board, the first terminal is arranged in the same layer as an electrode which is located on and farthest from the substrate where the first terminal is located, and the second terminal is arranged in the same layer as an electrode which is located on and farthest from the substrate where the second terminal is located.

In another aspect, embodiments of the present disclosure provide a display device. The display device includes a backlight module, the dimmable panel provided in the embodiments of the present disclosure, and a display panel, where the dimmable panel and the display panel are arranged at a light emitting side of the backlight module in a laminated manner.

In some embodiments, the display device provided in the embodiments of the present disclosure further includes a peep-proof protective film, where the peep-proof protective film is located between a light emitting side of a collimated backlight module and a laminate of the dimmable panel and the display panel.

DETAILED DESCRIPTION OF THE EMBODIMENTS

Figure 1:
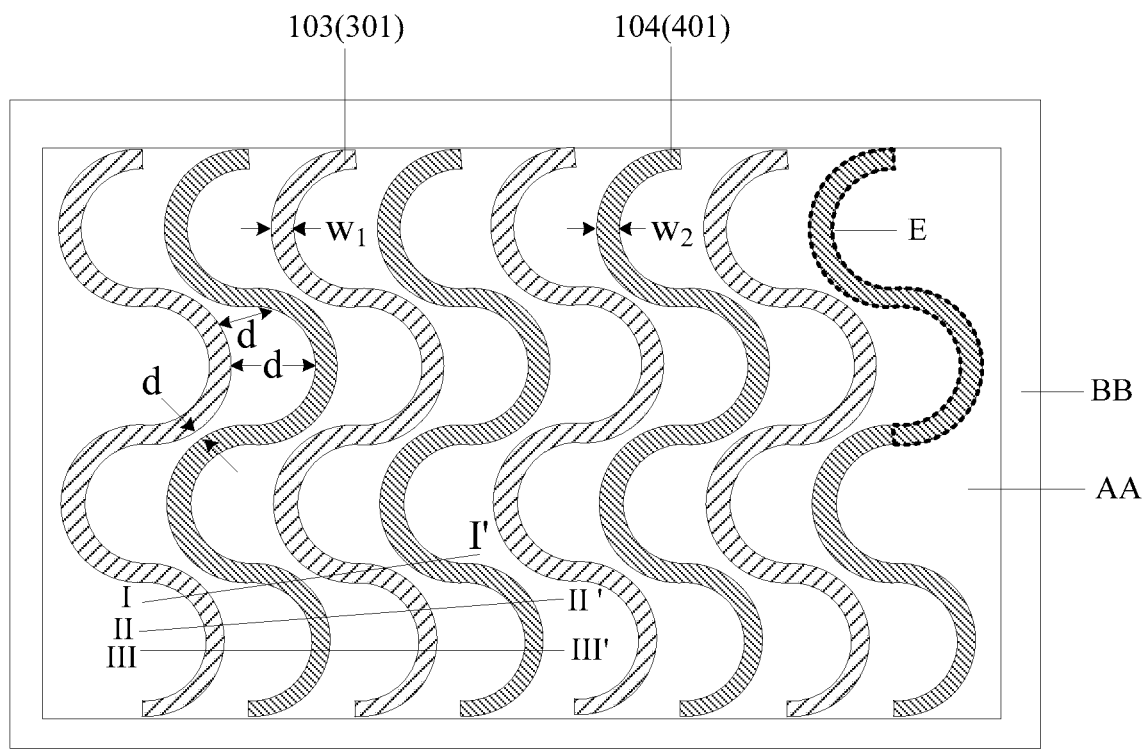
FIG. 1 shows a top view of a dimmable panel provided in embodiments of the present disclosure.

In order to make objectives, technical solutions, and advantages in examples of the present disclosure clearer, the technical solutions in the examples of the present disclosure will be clearly and completely described below with reference to the accompanying drawings in the examples of the present disclosure. It should be noted that a size and a shape of each figure in the drawings do not reflect a true scale, but only for illustrating the present disclosure. Throughout the drawings, identical or similar reference numerals denote identical or similar elements or elements having identical or similar functions.

Unless otherwise defined, technical or scientific terms used herein should have ordinary meanings as understood by those of ordinary skill in the art to which the present disclosure belongs. "First", "second" and similar words used in the description and claims of the present disclosure do not indicate any order, amount or importance, but only for distinguishing different components. "Including", "comprising" or other similar words indicate that the elements or objects before the word include elements or objects after the word and their equivalents, without excluding other elements or objects. "Inside", "outside", "upper", "lower", etc. are only used to indicate a relative positional relation. After an absolute position of the described object changes, the relative positional relation may also change accordingly.

In related technologies, a peep-proof state is mainly achieved by attaching a peep-proof protective film to a liquid crystal display. However, since a light emitting angle of the peep-proof protective film cannot be adjusted, the solution is only suitable for a requirement of the peep-proof state, and cannot achieve switch between the peep-proof state and a shared state, resulting in a single application scenario and poor user experience.

Figure 2:
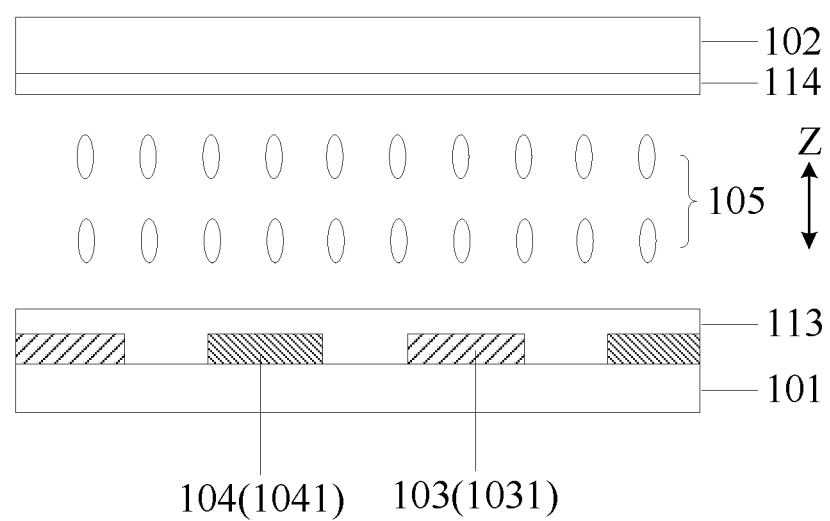
FIG. 2 shows a sectional view along a line I-I', a line II-II', and a line III-III' in FIG. 1.

To solve the technical problem existing in the related technologies, an embodiment of the present disclosure provides a dimmable panel. As shown in FIGS. 1 and 2, the dimmable panel has a dimmable area AA and includes:

a first substrate 101 and a second substrate 102 which are disposed opposite each other, where the first substrate 101 and the second substrate 102 may be made of transparent materials such as glass, organic polymer and so on;

a first electrode 103 and a second electrode 104 which are insulated from each other and located between the first substrate 101 and the second substrate 102, where the first electrode 103 and the second electrode 104 are located in the dimmable area AA, at least one of the first electrode 103 and the second electrode 104 includes a plurality of strip-shaped electrodes (such as first strip-shaped electrodes 1031 and/or second strip-shaped electrodes 1041), extension trends of the plurality of strip-shaped electrodes are approximately the same (that is, exactly the same or within an error range caused by factors of manufacturing, measurement, etc.), and orthographic projections of the plurality of strip-shaped electrodes on the first substrate 101 do not overlap each other; and a liquid crystal layer 105 located between the first substrate 101 and the second substrate 102, where the liquid crystal layer 105 is located in the dimmable area AA, the liquid crystal layer 105 is arranged in a different layer from a layer where the first electrode 103 is located and a layer where the second electrode 104 is located, and the liquid crystal layer 105 is configured to scatter incident light under the control of an electric field formed between the first electrode 103 and the second electrode 104. For peep-proof display, a peep-proof effect is better when backlight is collimated, and therefore, optionally, the dimmable panel of the disclosure may adjust the collimated incident backlight.

In the dimmable panel provided in the embodiments of the present disclosure, at least one of the first electrode 103 and the second electrode 104 includes the plurality of strip-shaped electrodes having approximately the same extension trends, such that after voltage is applied to the first electrode 103 and the second electrode 104, an electric field line formed between the first electrode 103 and the second electrode 104 tends to point from a positive electrode (for example, the first electrode 103) to a negative electrode (for example, the second electrode 104) in an extension direction of the strip-shaped electrodes, and liquid crystal molecules deflect under the action of the electric field. When the collimated light is emitted to the liquid crystal layer 105, the light may be scattered, such that the shared state is achieved. In addition, when no voltage is applied to the first electrode 103 and the second electrode 104, refractive indexes of different positions of the liquid crystal layer 105 in a vertical direction Z of the first substrate 101 are the same. The direction of the collimated light basically does not change after the collimated light passes through the liquid crystal layer 105, and the light is still collimated, such that the peep-proof state may be achieved. In this way, the switch between the peep-proof state and the shared state is achieved, and user experience is enhanced.

In some embodiments, the dimmable panel provided in the present disclosure may achieve a peep-proof effect through one-button switching. For example, via a physical button, software, application (APP), etc., a user may send a viewing angle switching request to the dimmable panel, and a flexible printed circuit board controls voltage signals applied to the first electrode 103 and the second electrode 104, so as to achieve the switch between the shared state and the peep-proof state.

FIGS. 1 and 2 show a dimmable panel provided in the embodiments of the present disclosure. As shown in FIGS. 1 and 2, the first electrode 103 is located at one side, facing the second substrate 102, of the first substrate 101; and the second electrode 104 and the first electrode 103 are arranged in the same layer; and the first electrode 103 includes a plurality of first strip-shaped electrodes 1031, the second electrode 104 includes a plurality of second strip-shaped electrodes 1041, the second strip-shaped electrodes 1041 and the first strip-shaped electrodes 1031 are arranged alternately, and the first strip-shaped electrodes 1031 and the second strip-shaped electrodes 1041 extend in a bent manner.

Figure 3:
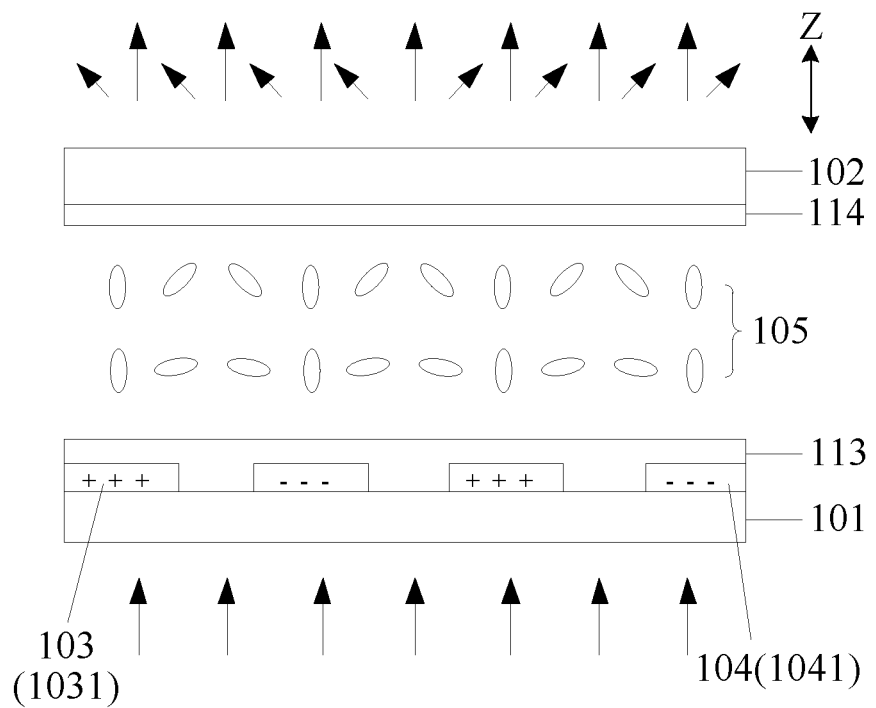
FIG. 3 shows a schematic diagram of light emitting of a dimmable panel provided in embodiments of the present disclosure in a shared state.
Figure 4:
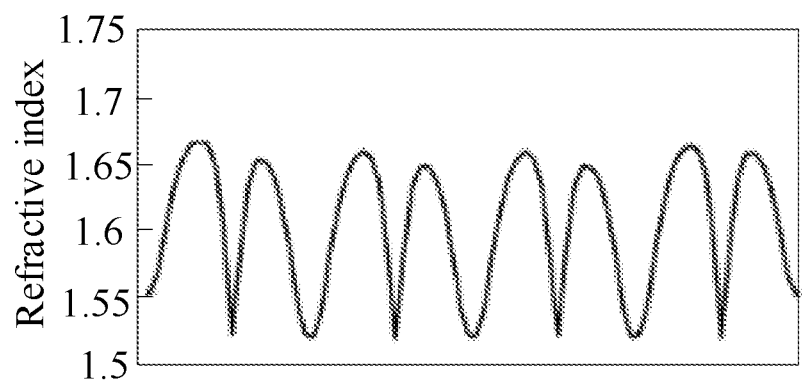
FIG. 4 shows refractive indexes of a liquid crystal layer of a dimmable panel provided in embodiments of the present disclosure in a shared state.
Figure 5:
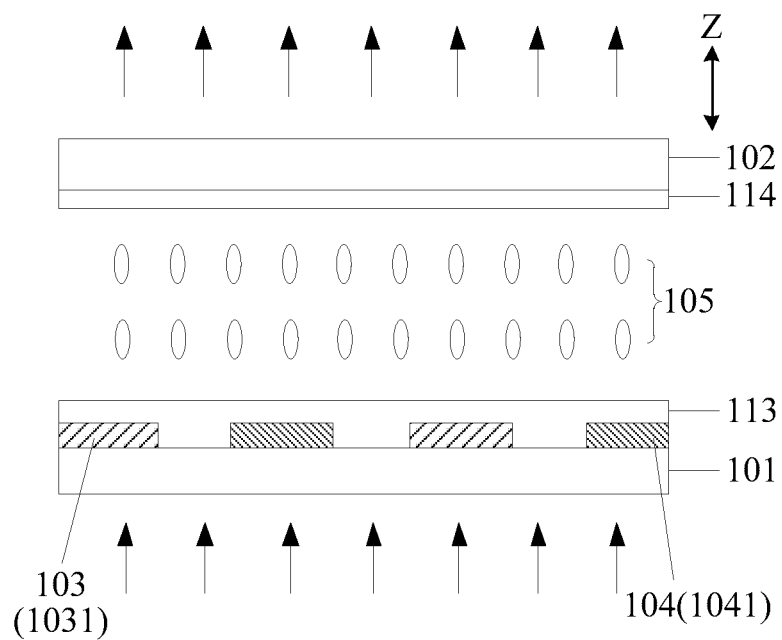
FIG. 5 shows a schematic diagram of light emitting of a dimmable panel provided in embodiments of the present disclosure in a peep-proof state.
Figure 6:
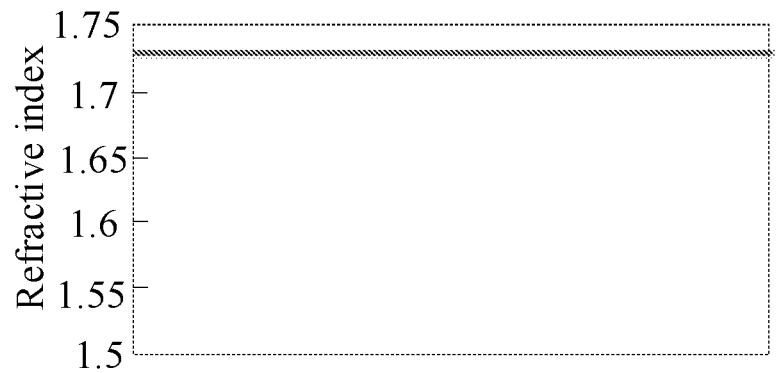
FIG. 6 shows a refractive index of a liquid crystal layer of a dimmable panel provided in embodiments of the present disclosure in a peep-proof state.

As shown in FIGS. 3 and 4, after voltage is applied to the first strip-shaped electrodes 1031 and the second strip-shaped electrodes 1041 that extend in a bent manner, an electric field line formed between the first strip-shaped electrodes 1031 and the second strip-shaped electrodes 1041 tends to point from positive electrodes (for example, the first strip-shaped electrodes 1031) to negative electrodes (for example, the second strip-shaped electrodes 1041) in a bending direction, and liquid crystal molecules deflect under the action of an electric field, such that refractive indexes of different positions of the liquid crystal layer 105 in a vertical direction Z of the first substrate 101 change. When the collimated light is emitted to the liquid crystal layer 105, the light may be scattered, such that the shared state is achieved. In addition, as shown in FIGS. 5 and 6, when no voltage is applied to the first strip-shaped electrodes 1031 and the second strip-shaped electrodes 1041, refractive indexes of different positions of the liquid crystal layer 105 in the vertical direction Z of the first substrate 101 are the same. The direction of the collimated light basically does not change after the collimated light passes through the liquid crystal layer 105, and the light is still collimated, such that a peep-proof state in all viewing angles (including upper, lower, left and right) may be achieved.

As shown in FIG. 1, an electrode structure of the disclosure is designed to extend in a bent manner such as an S shape or a zigzag shape, and an electric field that is formed between the first strip-shaped electrodes 1031 and the second strip-shaped electrodes 1041 and drives liquid crystals to rotate may have multiple directions. Compared with arrangement of electrodes extending in a straight line, in which an electric field may only be in a single extension direction perpendicular to the electrodes to achieve a peep-proof effect in one direction, in the disclosure, backlight may be scattered in multiple directions, such that a peep-proof effect in all viewing angles may be achieved, that is, the peep-proof effect in all viewing angles with contracted light in all directions is achieved; and since the backlight may be scattered in multiple directions in the disclosure, the shared state is also greatly improved. In addition, voltage is applied to the first strip-shaped electrodes 1031 and the second strip-shaped electrodes 1041, to form different voltage differences (for example, a voltage difference ranges from 1 V to 25 V), and deflection degrees of liquid crystal molecules may be controlled to be different, such that different scattering degrees of the liquid crystal layer for the collimated light may be controlled to achieve different sharing effects, switch between the peep-proof state in all viewing angles and multiple shared states is achieved, and user experience may be significantly enhanced.

It should be noted that, as shown in FIG. 3, the first strip-shaped electrodes 1031 and the second strip-shaped electrodes 1041 are designed in the same layer. Optionally, the first strip-shaped electrode 1031 and the second strip-shaped electrode 1041 may be designed in different layers, for example, the first strip-shaped electrode and the second strip-shaped electrode are both arranged at a side of the first substrate 101, and are insulated from each other in different layers; and certainly, one of the first strip-shaped electrode and the second strip-shaped electrode may be arranged on the second substrate 102, the other one of the first strip-shaped electrode and the second strip-shaped electrode may be arranged on the first substrate 101, and the first strip-shaped electrode 1031 and the second strip-shaped electrode 1041 do not overlap each other in a direction perpendicular to the first substrate 101. The optional structures may be set according to an actual process, which are not limited herein.

It should be noted that, in the present disclosure, "the same layer" refers to a layer structure formed by using the same film forming process to form a film layer for making a specific pattern, and then using the same mask and a single mask patterning process. That is, a single mask patterning process corresponds to a mask (also called a photomask). According to different specific patterns, a single mask patterning process may include multi-times exposure, development or etching processes, and specific patterns in the formed layer structure may be continuous or discontinuous. The specific patterns may have the same height or the same thickness, or may have different heights or different thicknesses.

In some embodiments, as shown in FIG. 1, in order to obtain a better shared-state effect, shapes of the first strip-shaped electrodes 1031 may be approximately the same as those of the second strip-shaped electrodes 1041 (that is, exactly the same or within an error range caused by factors of manufacturing, measurement). Moreover, a line width $w_1$ of the first strip-shaped electrodes 1031 and a line width $w_2$ of the second strip-shaped electrodes 1041 may be the same or different, the line width $w_1$ of the first strip-shaped electrodes 1031 and the line width $w_2$ of the second strip-shaped electrodes 1041 may range from 1.0 μm to 15 μm, and line distances d between the first strip-shaped electrodes 1031 and the second strip-shaped electrodes 1041 at different positions may range from 2.0 μm to 15 μm. For example, the line width $w_1$ of the first strip-shaped electrodes 1031 and the line width $w_2$ of the second strip-shaped electrodes 1041 may all be 1 μm, 5 μm, 10 μm, 15 μm, etc., and the line distances d between the first strip-shaped electrodes 1031 and the second strip-shaped electrodes 1041 at different positions may be 2 μm, 5 μm, 10 μm, 15 μm, etc.

Figure 7:
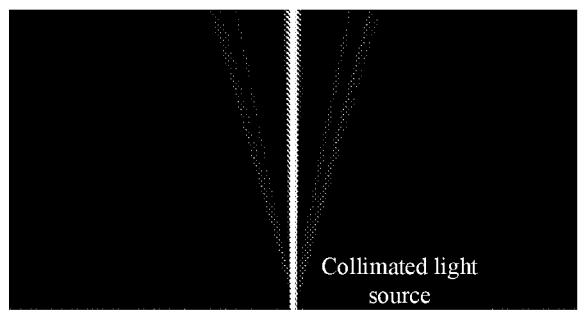
FIG. 7 shows a schematic diagram of collimated light passing through a dimmable panel in a peep-proof state provided in embodiments of the present disclosure.
Figure 8:
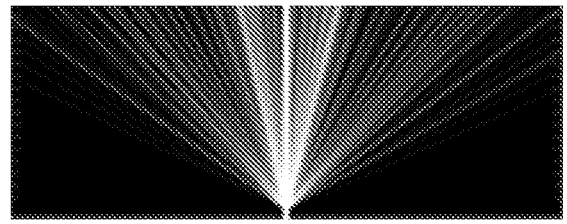
FIG. 8 shows a schematic diagram of scattering of collimated light after the collimated light passes through a dimmable panel in a shared state provided in embodiments of the present disclosure.
Figure 9:
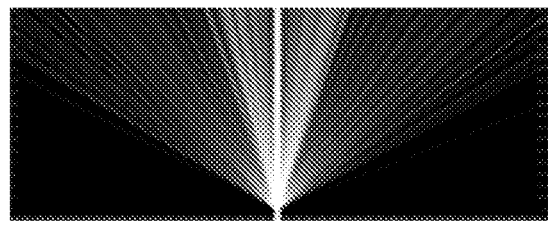
FIG. 9 shows another schematic diagram of scattering of collimated light after the collimated light passes through a dimmable panel in a shared state provided in embodiments of the present disclosure.
Figure 10:
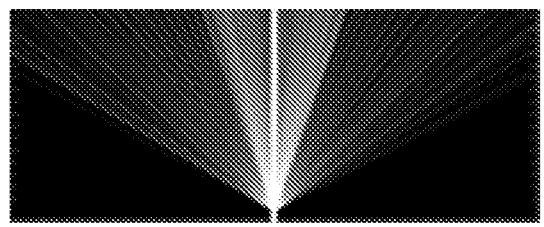
FIG. 10 shows another schematic diagram of scattering of collimated light after the collimated light passes through a dimmable panel in a shared state provided in embodiments of the present disclosure.
Figure 11:
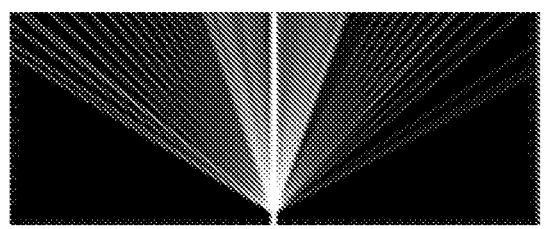
FIG. 11 shows another schematic diagram of scattering of collimated light after the collimated light passes through a dimmable panel in a shared state provided in embodiments of the present disclosure.
Figure 12:
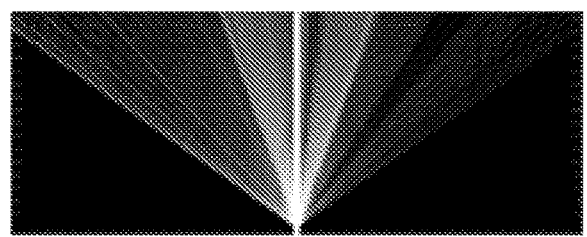
FIG. 12 shows another schematic diagram of scattering of collimated light after the collimated light passes through a dimmable panel in a shared state provided in embodiments of the present disclosure.
Figure 13:
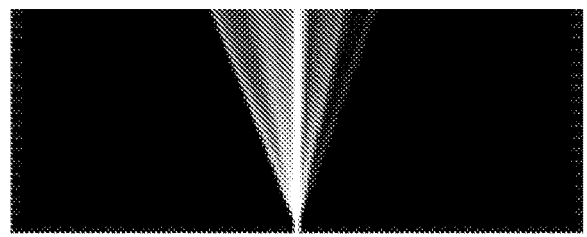
FIG. 13 shows another schematic diagram of scattering of collimated light after the collimated light passes through a dimmable panel in a shared state provided in embodiments of the present disclosure.

Optionally, the present disclosure further provides effect diagrams of a peep-proof state and a shared state under different line widths and line distances, as shown in FIGS. 7-13. Specifically, FIG. 7 shows an effect diagram of a peep-proof state under different line widths and line distances, and FIGS. 8-13 are effect diagrams of a shared state corresponding to line width/line distance ratios of 3:3, 3:4, 3:5, 3:6, 3:8 and 3:20, respectively. For example, in FIGS. 8-13, line widths are all 3 μm; and line distances are 3 μm, 4 μm, 5 μm, 6 μm, 8 μm, and 20 μm, respectively. As shown in FIG. 7, in the peep-proof state, a collimated light beam emitted from a collimated light source still keeps a desirable collimating effect after passing through the dimmable panel. As shown in FIGS. 8-12, when a line width/line distance ratio decreases from 3:3 to 3:4, 3:5, 3:6, and 3:8 in sequence, the light scattering degree is the higher, and the shared-state effect is better. However, as shown in FIG. 13, when a line width/line distance ratio is 3:20, the light scattering degree is the weaker, and the shared-state effect is acceptable. Therefore, in the present disclosure, line widths and line distances of the first strip-shaped electrodes 1031 and the second strip-shaped electrodes 1041 cannot be infinitely increased. When the line widths are increased, a driving force for driving liquid crystal to rotate and scatter light may be weakened. As shown in FIGS. 8-13, a too large line distance may weaken the shared-state effect, so a ratio of a line width to a line distance of the first strip-shaped electrodes 1031 and the second strip-shaped electrodes 1041 at any position in the extension direction needs to range from 3/20 to 3/3.

Figure 14:
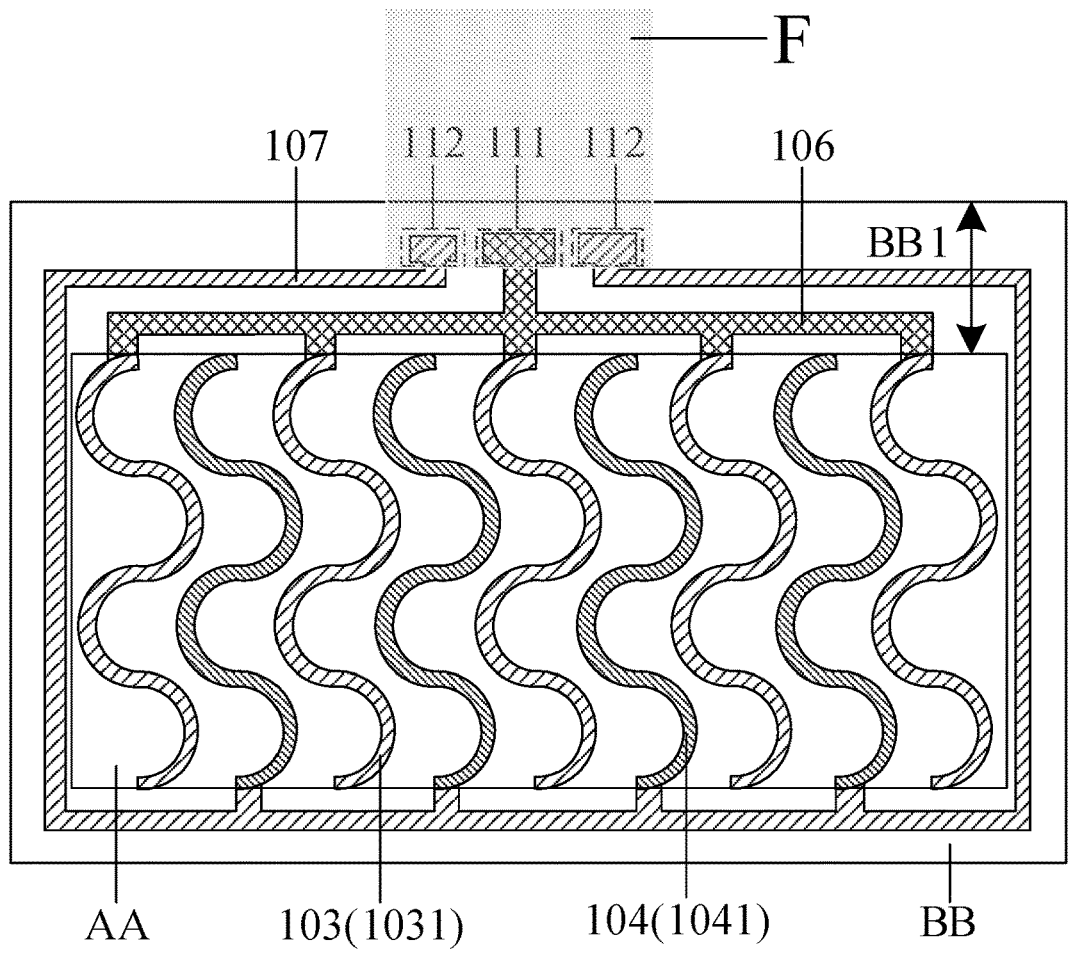
FIG. 14 shows another top view of a dimmable panel provided in embodiments of the present disclosure.

In some embodiments, in order to apply voltage to the first strip-shaped electrodes 1031 and the second strip-shaped electrodes 1041, as shown in FIG. 14, a first lead 106 and a second lead 107 may be arranged in a peripheral area BB surrounding the dimmable area AA, the first lead 106 is electrically connected to the first strip-shaped electrodes 1031, and the second lead 107 is electrically connected to the second strip-shaped electrodes 1041.

Optionally, the first lead 106 and the second lead 107 may be arranged in the same layer as the first strip-shaped electrodes 1031 and the second strip-shaped electrodes 1041. For example, the first lead 106 and the first strip-shaped electrodes 1031 are integrally arranged, and the second lead 107 and the second strip-shaped electrodes 1041 are integrally arranged. Optionally, the first lead 106, the second lead 107, the first strip-shaped electrodes 1031 and the second strip-shaped electrodes 1041 may be arranged in the same layer and made of the same materials, such as indium tin oxide (ITO). Alternatively, in order to reduce resistance, the first lead 106 and the second lead 107 may be made of metal, and the first strip-shaped electrodes 1031 and the second strip-shaped electrodes 1041 may be made of ITO; in this case, the first strip-shaped electrodes 1031 and the second strip-shaped electrodes 1041 are designed in the same layer, the first lead 106 and the second lead 107 are designed in the same layer, the first lead 106 is electrically connected to the first strip-shaped electrodes 1031 through via holes, and the second lead 107 is electrically connected to the second strip-shaped electrodes 1041 through via holes, which are not limited herein. When the first lead 106 and the second lead 107 are arranged in the same layer as the first strip-shaped electrodes 1031 and the second strip-shaped electrodes 1041, in order to avoid short circuit between the first lead 106 and the second strip-shaped electrodes 1041 and short circuit between the second lead 107 and the first strip-shaped electrodes 1031, the first lead 106 needs to be electrically connected to the end, close to a first peripheral area BB1, of each first strip-shaped electrode 1031; and the second lead 107 needs to be electrically connected to the end, away from the first peripheral area BB1, of each second strip-shaped electrode 1041. The first peripheral area BB1 is configured to bond a circuit board (for example, a flexible printed circuit board (FPC)), and is located at one side of the first strip-shaped electrodes 1031 and the second strip-shaped electrodes 1041 in an alternating arrangement direction.

Figure 15:
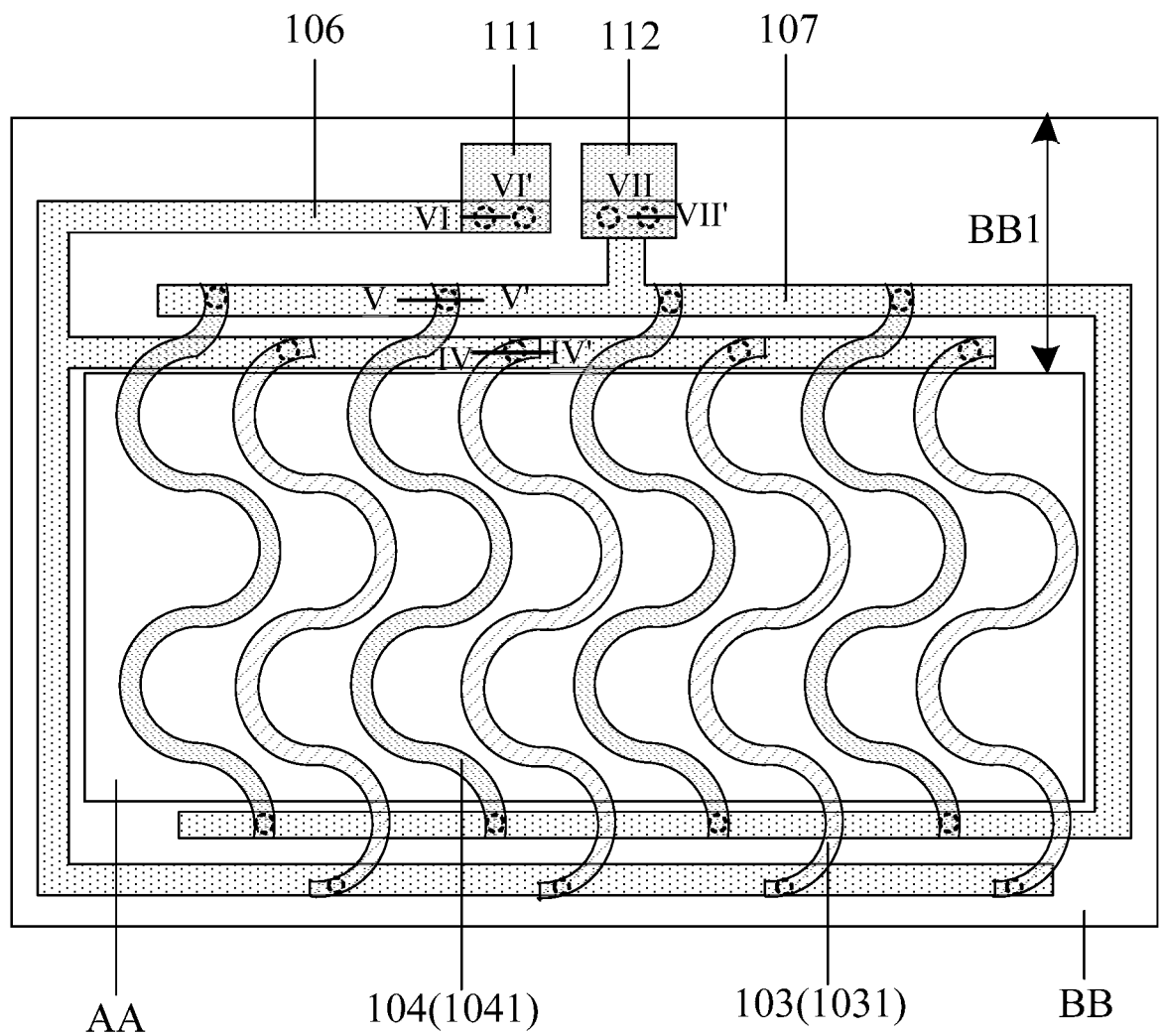
FIG. 15 shows another top view of a dimmable panel provided in embodiments of the present disclosure.
Figure 16:
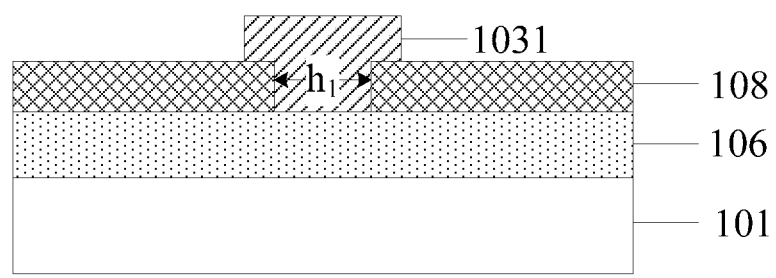
FIG. 16 shows a sectional view along a line IV-IV' in FIG. 15.
Figure 17:
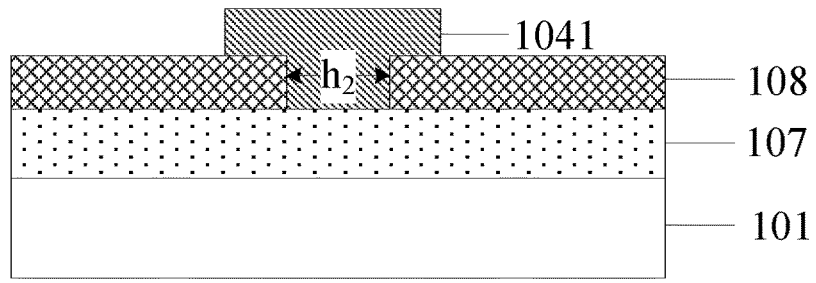
FIG. 17 shows a sectional view along a line V-V' in FIG. 15.

In some embodiments, as shown in FIGS. 15-17, the first lead 106 and the second lead 107 may further be located in the same layer and located between a layer where the first strip-shaped electrodes 1031 are located and the first substrate 101. Optionally, in order to maintain consistency of signal intensity from the ends, close to the first peripheral area BB1, of the first strip-shaped electrodes 1031 to the other ends, away from the first peripheral area BB1, of the first strip-shaped electrodes, the first lead 106 may be electrically connected to two ends of each first strip-shaped electrode 1031. For similar reasons, the second lead 107 may be electrically connected to two ends of each second strip-shaped electrode 1041. In addition, in order to avoid short circuit between the first lead 106 and the second strip-shaped electrodes 1041 and short circuit between the second lead 107 and the first strip-shaped electrodes 1031, as shown in FIG. 16, a first insulation layer 108 between the layer where the first strip-shaped electrodes 1031 are located and a layer where the first lead 106 is located may further be at least arranged in the peripheral area BB. The first insulation layer 108 includes a first via hole $h_1$ and a second via hole $h_2$ in the peripheral area BB, an orthographic projection of the first via hole $h_1$ on the first substrate 101 is located in an orthographic projection of the first lead 106 on the first substrate 101, and the first lead 106 is electrically connected to the first strip-shaped electrodes 1031 via the first via hole $h_1$; and an orthographic projection of the second via hole $h_2$ on the first substrate 101 is located in an orthographic projection of the second lead 107 on the first substrate 101, and the second lead 107 is electrically connected to the second strip-shaped electrodes 1041 via the second via hole $h_2$.

Figure 18:
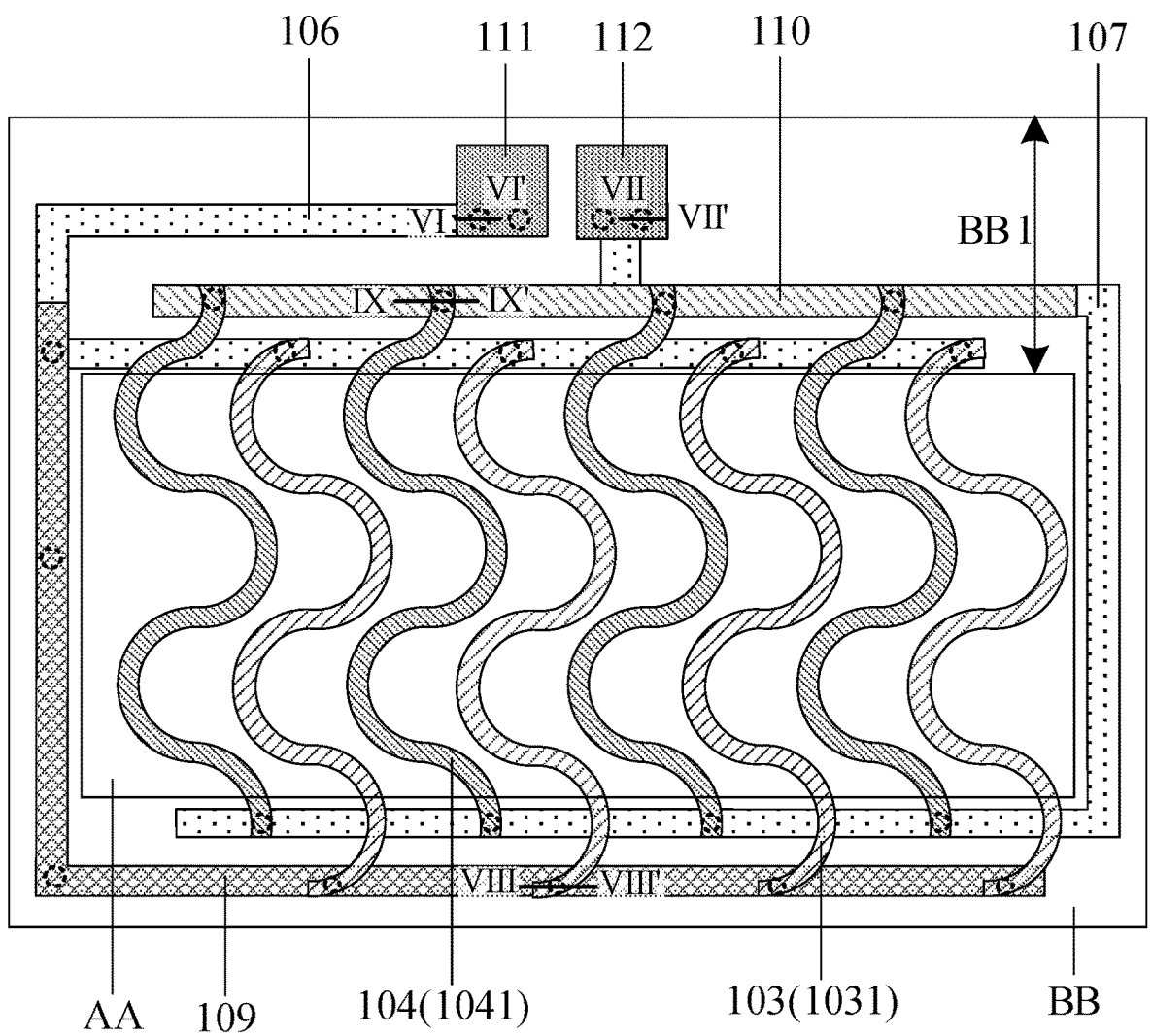
FIG. 18 shows another top view of a dimmable panel provided in embodiments of the present disclosure.
Figure 19:
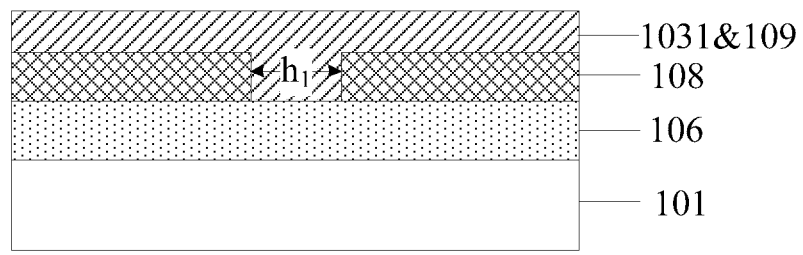
FIG. 19 shows a sectional view along a line VIII-VIII' in FIG. 18.
Figure 20:
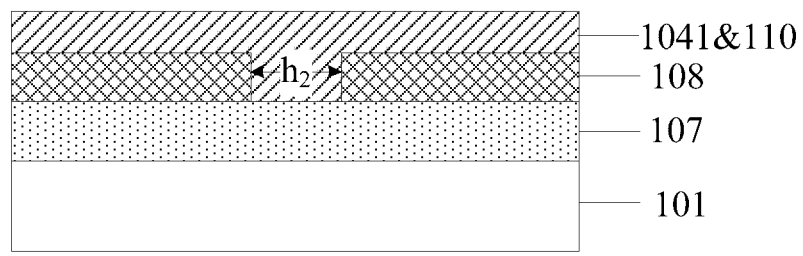
FIG. 20 shows a sectional view along a line IX-IX' in FIG. 18.
Figure 21:
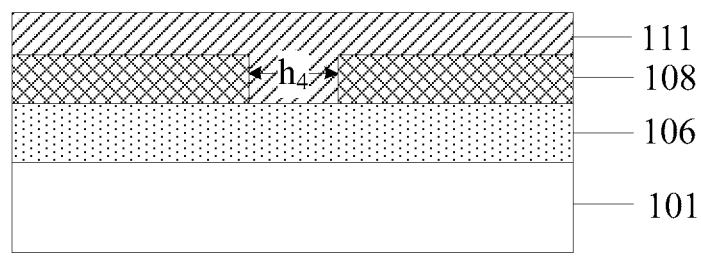
FIG. 21 shows a sectional view along a line VI-VI' in FIGS. 15 and 18.
Figure 22:
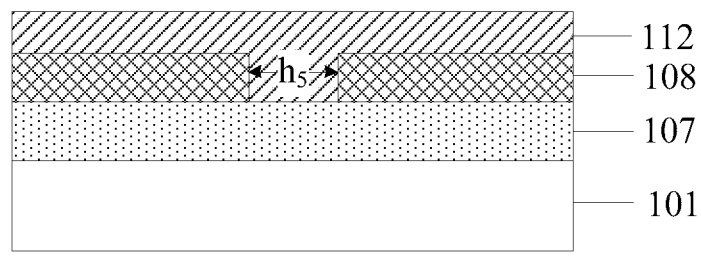
FIG. 22 shows a sectional view along a line VII-VII' in FIGS. 15 and 18.

Optionally, as shown in FIGS. 18-20, in order to reduce resistance and loss of voltage signals on a transmission path, a first resistance reduction line 109 and a second resistance reduction line 110 may be arranged in the peripheral area BB, where the first resistance reduction line 109 and the first strip-shaped electrodes 1031 are integrally arranged in the same layer, and the second resistance reduction line 110 and the second strip-shaped electrodes 1041 are integrally arranged in the same layer. Optionally, an orthographic projection of the first resistance reduction line 109 on the first substrate 101 may be located in the orthographic projection of the first lead 106 on the first substrate 101 and avoid the second strip-shaped electrodes 1041, and an orthographic projection of the second resistance reduction line 110 on the first substrate 101 may be located in the orthographic projection of the second lead 107 on the first substrate 101 and avoid the first strip-shaped electrodes 1031, such that resistance may be reduced to the greatest extent, and stability of voltage signals on the first strip-shaped electrodes 1031 and the second strip-shaped electrodes 1041 may be ensured. Optionally, the first lead 106 and the second lead 107 are made of metal, and the first resistance reduction line 109, the second resistance reduction line 110, the first strip-shaped electrodes 1031 and the second strip-shaped electrodes 1041 are arranged in the same layer or different layers and made of the same materials such as ITO; and alternatively, the first resistance reduction line 109 and the second resistance reduction line 110 may be made of metal, which are not limited herein.

In some embodiments, as shown in FIGS. 14, 15, 18, 21 and 22, a first terminal 111 and a second terminal 112 may further be arranged in the first peripheral area BB1, where the first terminal 111 is connected to the first lead 106 and the circuit board F; and the pads on the circuit board F are electrically connected with the first terminal 111 and the second terminal 112. Optionally, the circuit board may be a printed circuit board (PCB) or a flexible circuit board (FPC), which is not limited herein, the second terminal 112 is connected to the second lead 107 and the circuit board, and the first terminal 111 and the second terminal 112 are arranged in the same layer as the first strip-shaped electrodes 1031. The first terminal 111 is located in the same layer as an electrode which is farthest from a substrate where the first terminal 111 is located; and the second terminal 112 is located in the same layer as an electrode which is farthest from the substrate where the second terminal 112 is located. Optionally, as shown in FIG. 14, when the first lead 106 and the second lead 107 are also arranged in the same layer as the first strip-shaped electrodes 1031, the first terminal 111 and the first lead 106 may be integrally arranged, and the second terminal 112 and the second lead 107 may be integrally arranged. Optionally, the first terminal 111 and the first lead 106 are disposed on a gate metal layer, and the second terminal 112 and the second lead 107 are disposed on the gate metal layer. Continue to refer to FIG. 15 and FIG. 18, optionally, the first strip-shaped electrodes 1031 and the second strip-shaped electrodes 1041 are located in the same layer, and the first insulation layer 108 is located between the layer where the first lead 106 and the second lead 107 are located and the first strip-shaped electrodes 1031; in this case, the first terminal 111 and the second terminal 112 are located in the same layer as the electrodes which are farthest from the substrate where the first terminal 111 and the second terminal 112 are located; that is, the electrode layer farthest from the substrate is the layer where the first strip-shaped electrodes 1031 and the second strip-shaped electrodes 1041 are located (in this case, the electrodes 1031 and the electrodes 1041 are arranged in the same layer). It should be noted that when the first strip-shaped electrodes 1031 and the second strip-shaped electrodes 1041 are located in the same layer, if the display substrate is further provided with an additional electrode layer, and the additional electrode layer is located on the side, far away from the substrate, of the first strip-shaped electrodes 1031 and the second strip-shaped electrodes 1041, then the electrode layer farthest from the substrate is the additional electrode layer, to expose the corresponding electrode layer of the first terminal 111 and the second terminal 112 for electrical connection with the circuit board. As shown in FIGS. 15, 18, 21 and 22, when the first insulation layer 108 is arranged between a layer where the first lead 106 and the second lead 107 are located and a layer where the first strip-shaped electrodes 1031 and the second strip-shaped electrodes 1041 are located, the first lead 106 may be electrically connected to the first terminal 111 via a fourth via hole $h_4$ penetrating the first insulation layer 108, and the second lead 107 may be electrically connected to the second terminal 112 via a fifth via hole $h_5$ penetrating the first insulation layer 108. In order to ensure transmittance, the layer where the first strip-shaped electrodes 1031 are located needs to be made of conductive materials having high transmittance (such as ITO and indium zinc oxide (IZO)), etc. These conductive materials have a desirable effect of preventing water and oxygen corrosion. The first terminal 111 and the second terminal 112 made of the same materials as the first strip-shaped electrodes 1031 are connected to the circuit board, such that desirable electrical connection performance is ensured.

In some embodiments, as shown in FIG. 2, the dimmable panel provided in the embodiments of the present disclosure may further include a first alignment layer 113 located at one side, away from the first substrate 101, of the layer where the first strip-shaped electrodes 1031 are located; and a second alignment layer 114 located at one side, facing the first substrate 101, of the second substrate 102. The first alignment layer 113 and the second alignment layer 114 may make liquid crystal molecules in the liquid crystal layer 105 have an initial tilt state, such that the molecules may respond quickly and deflect when being driven by an electric field. Optionally, in the present disclosure, the liquid crystal molecules may be positive liquid crystal molecules, an alignment direction is a vertical direction Z of the first substrate 101, and an alignment angle ranges from 85° to 90°, such as 85°, 86°, 87°, 88°, 89°, and 90°, such that the positive liquid crystal molecules may be anchored in an initial state substantially parallel to the vertical direction Z of the first substrate. Certainly, in some embodiments, the liquid crystal molecules may also be negative liquid crystal molecules, an alignment direction is parallel to the first substrate 101, and an alignment angle ranges from 0° to 10°, such as 0°, 5°, and 10°, such that the negative liquid crystal molecules may be anchored in an initial state substantially parallel to the first substrate. Both the positive liquid crystal molecules and the negative liquid crystal molecules have birefringence effects, and a difference Δn (that is, Δn=ne−no) between a refractive index ne of extraordinary light and a refractive index no of ordinary light may range from 0.08 to 0.3, for example, Δn is 0.08, 0.1, 0.2, 0.3, etc. Optionally, an overall box thickness of the dimmable panel ranges from 2 μm to 50 μm, such as 2 μm, 5 μm, 10 μm, 20 μm, 30 μm, 40 μm, 50 μm, etc.

Figure 23:
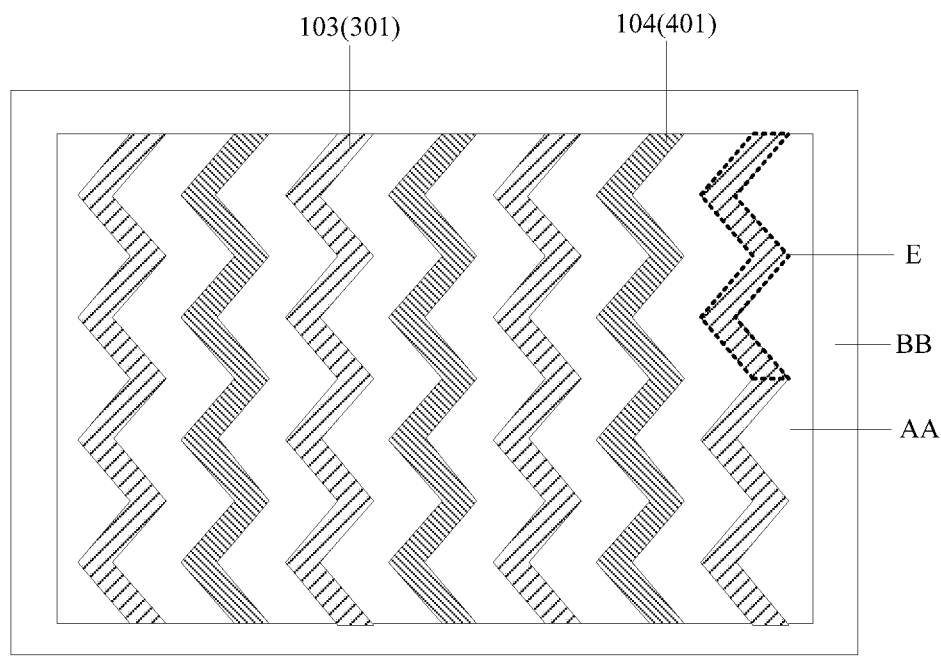
FIG. 23 shows another top view of a dimmable panel provided in embodiments of the present disclosure.

In some embodiments, as shown in FIGS. 1 and 23, each of the first strip-shaped electrodes 1031 and the second strip-shaped electrodes 1041 may include a plurality of sub-electrodes E connected in sequence, and the sub-electrodes E are S-shaped or zigzag (for example, W-shaped). Certainly, in specific embodiments, the same strip-shaped electrode may also have an S-shaped sub-electrode E and a zigzag sub-electrode E at the same time, which is not limited herein.

It should be noted that the dimmable panel provided in the embodiments of the present disclosure may further include a post-spacers (PS), sealant, etc. Other essential components of the dimmable panel may be understood by those of ordinary skill in the art, are not repeated herein, and should not be taken as a limitation to the present disclosure.

Figure 24:
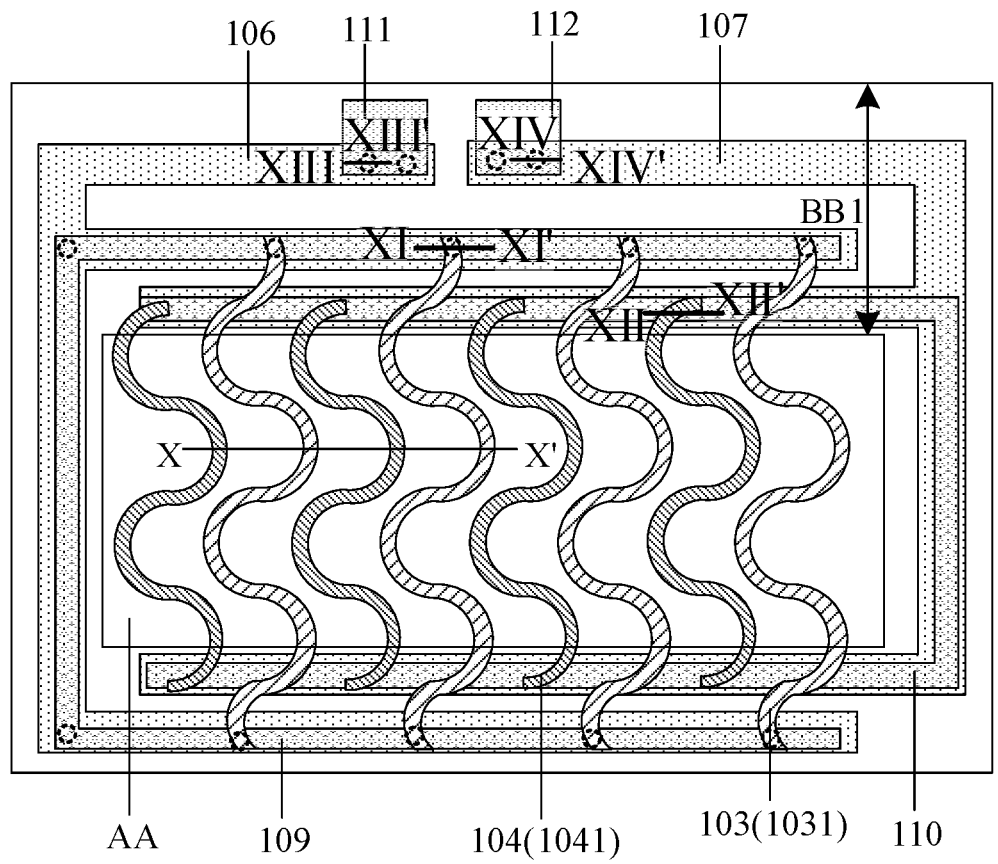
FIG. 24 shows another top view of a dimmable panel provided in embodiments of the present disclosure.
Figure 25:
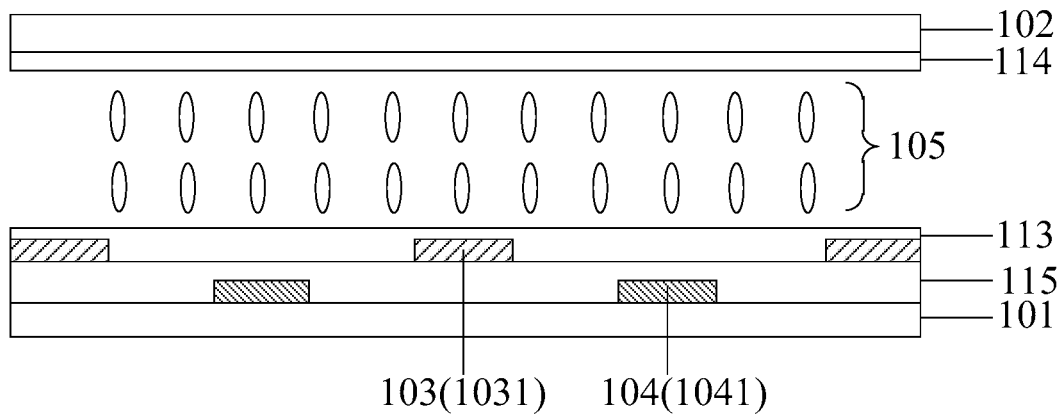
FIG. 25 shows a sectional view along a line X-X' in FIG. 24.
Figure 26:
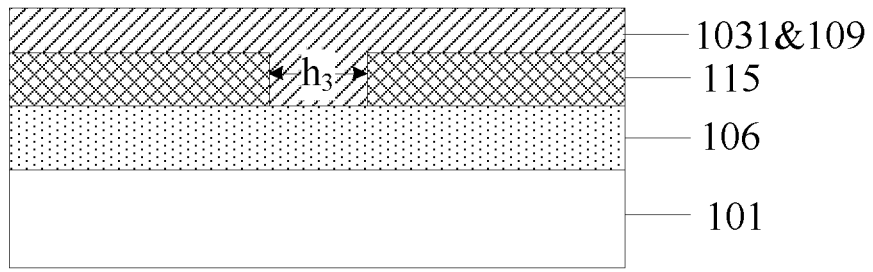
FIG. 26 shows a sectional view along a line XI-XI' in FIG. 24.

FIGS. 24 and 25 show a dimmable panel provided in the embodiments of the present disclosure. In the dimmable panel, a first electrode 103 is located at one side, facing a second substrate 102, of a first substrate 101; a second electrode 104 is located between a layer where the first electrode 103 is located and the first substrate 101; and the first electrode 103 includes a plurality of first strip-shaped electrodes 1031 extending in a bent manner, the second electrode 104 includes a plurality of second strip-shaped electrodes 1041 extending in a bent manner, and orthographic projections of the second strip-shaped electrodes 1041 on the first substrate 101 and orthographic projections of the first strip-shaped electrodes 1031 on the first substrate 101 are arranged alternately. It may be seen that the structure of the first electrode 103 and the second electrode 104 in FIGS. 24 and 25 are the same as that of the first electrode 103 and the second electrode 104 in FIGS. 1 and 2, with the only difference being film layer positions. Refer to FIG. 24 and FIG. 25, the first electrodes 103 and the second electrodes 104 are located in different layers; and FIG. 25 shows that the first electrodes 103 are arranged on the side, away from the substrate 101, of the second electrodes 104. Of course, the second electrodes 104 may also be arranged on the side, away from the substrate 101, of the first electrodes 103, which is not limited herein. Refer to FIG. 24, when the first electrodes 103 are arranged on the side, away from the substrate 101, of the second electrodes 104, and the second terminal 112 is connected with the second lead 107 and the circuit board, the first terminal 111 is located in the same layer as the electrodes farthest from the substrate 101 where the first terminal 111 is located, and the second terminal 112 is located in the same layer as the electrodes farthest from the substrate 101 where the second terminal 112 is located. In this case, the electrode layer farthest from the substrate 101 is the layer where the first electrodes 103 are located, that is, the electrical connection between the first terminal (and the second terminal) and the circuit board is achieved through the layer where the first electrodes 103 are located. Therefore, a principle of achieving switch between a peep-proof state in all viewing angles and a shared state in FIGS. 24 and 25 may refer to the related contents in FIGS. 1 and 2, which will not be repeated herein.

In addition, the dimmable panel shown in FIGS. 24 and 25 also has a liquid crystal layer 105, a first lead 106, a second lead 107, a first resistance reduction line 109, a second resistance reduction line 110, a first terminal 111, a second terminal 112, a first alignment layer 113, and a second alignment layer 114. Only differences between the above components and the corresponding components in FIGS. 1, 14, 15 and 18 will be described below, and repeated contents will not be described herein.

Figure 27:
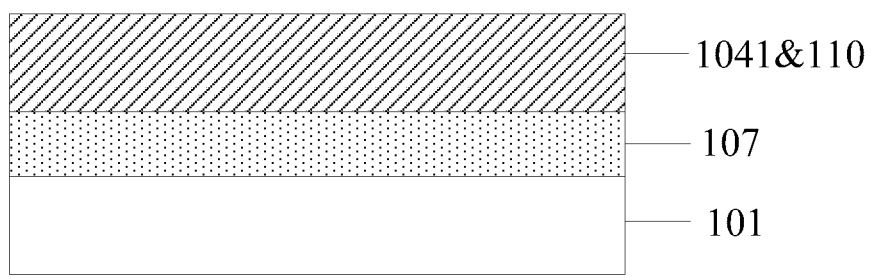
FIG. 27 shows a sectional view along a line XII-XII' in FIG. 24.

Specifically, as shown in FIGS. 24-27, the first lead 106 and the second lead 107 are located in the same layer and located between the first substrate 101 and a layer where the second strip-shaped electrodes 1041 are located, and a second insulation layer 115 between a layer where the first strip-shaped electrodes 1031 are located and the layer where the second strip-shaped electrodes 1041 are located is located in a dimmable area AA and a peripheral area BB. The second insulation layer 115 has a third via hole $h_3$ in the peripheral area BB, and an orthographic projection of the third via hole $h_3$ on the first substrate 101 is located in an orthographic projection of the first lead 106 on the first substrate 101. The first lead 106 is electrically connected to the first strip-shaped electrodes 1031 via the third via hole $h_3$ penetrating the second insulation layer 115, and the second lead 107 may be in contact and electric connection with the second strip-shaped electrodes 1041. Refer to FIG. 24 and FIG. 27, when the first electrodes 103 and the second electrodes 104 are located in different layers, the first electrodes 103 are arranged on the side, away from the substrate 101, of the second electrodes 104. Optionally, the second electrodes 104 may be directly electrically connected with the second lead 107, that is, there is no insulation layer between the second electrodes 104 and the second lead 107. In the process, the second lead layer may be deposited first and then patterned to form the second lead 107, and then the second electrode layer may be deposited and patterned to form the pattern of the second electrodes 104. Or, the second electrode layer may be deposited first on the substrate and patterned to form the pattern of the second electrodes 104, and then the second lead layer may be deposited and patterned to form the second lead 107, which is not limited herein. Optionally, the first lead 106 and the second lead 107 are prepared on the same layer by adopting the same material, for example, the first lead 106 and the second lead 107 are prepared on the gate metal layer.

Figure 28:
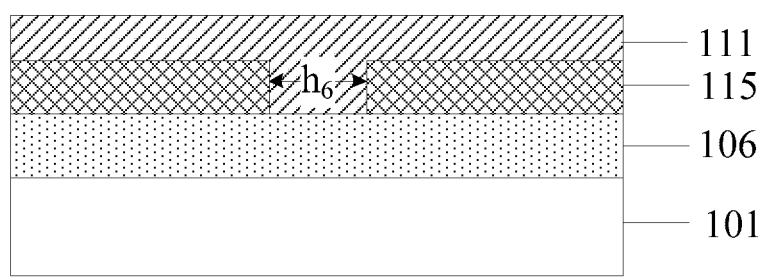
FIG. 28 shows a sectional view along a line XIII-XIII' in FIG. 24.
Figure 29:
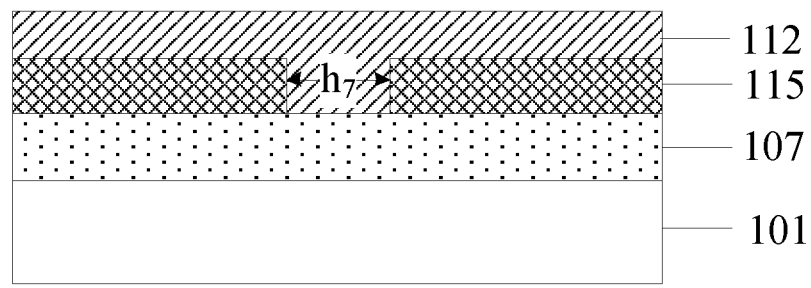
FIG. 29 shows a sectional view along a line XIV-XIV' in FIG. 24.

In some embodiments, as shown in FIGS. 24, 28 and 29, the first terminal 111 and the second terminal 112 may be arranged in the same layer as the first strip-shaped electrodes 1031, and the first terminal 111 is electrically connected to the first lead 106 via a sixth via hole $h_6$ penetrating the second insulation layer 115, and the second terminal 112 is electrically connected to the second lead 107 via a seventh via hole $h_7$ penetrating the second insulation layer 115. In addition, the first terminal 111 may be arranged in the layer where the first strip-shaped electrodes 1031 are located and the layer where the second strip-shaped electrodes 1041 are located at the same time, such that the first terminal 111 has a laminated structure. Similarly, the second terminal 112 may be arranged in the layer where the first strip-shaped electrodes 1031 are located and the layer where the second strip-shaped electrodes 1041 are located at the same time, such that the second terminal 112 has a laminated structure.

Figure 30:
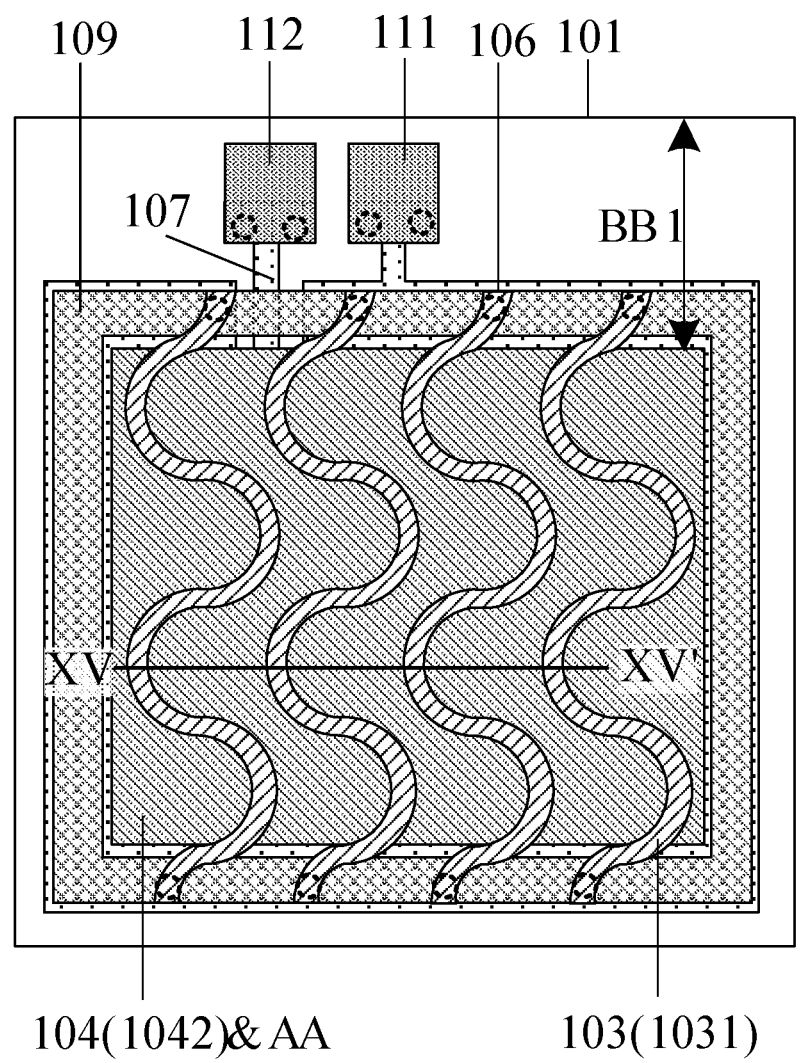
FIG. 30 shows another top view of a dimmable panel provided in embodiments of the present disclosure.
Figure 31:
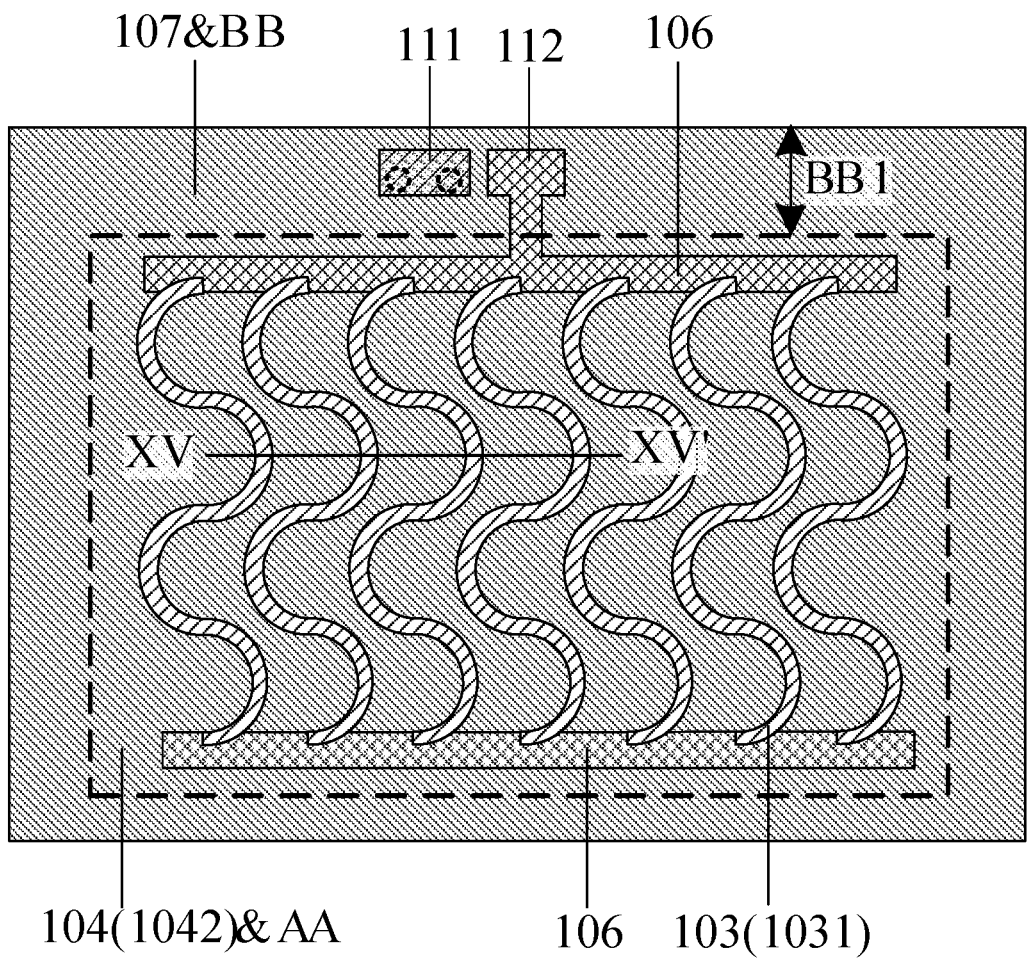
FIG. 31 shows another top view of a dimmable panel provided in embodiments of the present disclosure.
Figure 32:
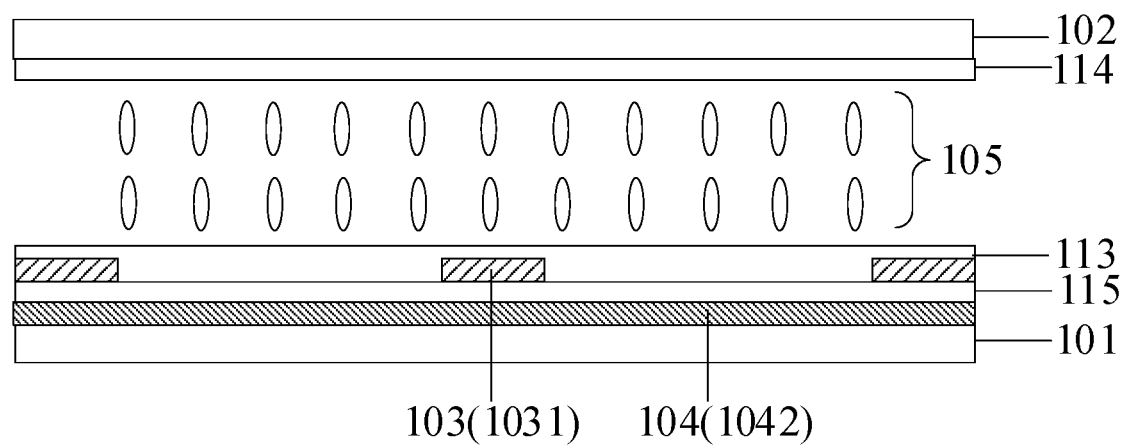
FIG. 32 shows a sectional view along a line XV-XV' in FIGS. 30 and 31.

FIGS. 30-32 show dimmable panels provided in the embodiments of the present disclosure. In the dimmable panel, a first electrode 103 is located at one side, facing a second substrate 102, of a first substrate 101; a second electrode 104 is located between a layer where the first electrode 103 is located and the first substrate 101; and the first electrode 103 includes a plurality of first strip-shaped electrodes 1031 extending in a bent manner, and the second electrode 104 is a planar electrode 1042.

For the dimmable panel shown in FIGS. 30-32, after voltage is applied to the planar electrode 1042 and the first strip-shaped electrodes 1031 extending in a bent manner, an electric field line formed between the first strip-shaped electrodes 1031 and the planar electrode 1042 tends to point from a positive electrode (for example, the first strip-shaped electrodes 1031) to a negative electrode (for example, the planar electrode 1042) in a bending direction and a facing direction of the first strip-shaped electrodes and the planar electrode, and liquid crystal molecules deflect under the action of an electric field, such that refractive indexes of different positions of a liquid crystal layer 105 in a vertical direction Z of the first substrate 101 change. When collimated light is emitted to the liquid crystal layer 105, and the light may be scattered, such that a shared state is achieved. In addition, when no voltage is applied to the first strip-shaped electrodes 1031 and the planar electrode 1042, refractive indexes of different positions of the liquid crystal layer 105 in the vertical direction Z of the first substrate 101 are the same; and the direction of collimated light basically does not change after the collimated light passes through the liquid crystal layer 105, and the light is still collimated, such that a peep-proof state in all viewing angles (including upper, lower, left and right) may be achieved. In addition, voltage is applied to the first strip-shaped electrodes 1031 and the planar electrode 1042, to form different voltage differences (for example, a voltage difference ranges from 1 V to 25 V), and deflection degrees of liquid crystal molecules may be controlled to be different, such that different scattering degrees of the liquid crystal layer for the collimated light may be controlled to achieve different sharing effects, switch between the peep-proof state in all viewing angles and multiple shared states is achieved, and user experience may be significantly enhanced.

In FIG. 30, a first lead 106 and a second lead 107 may be located in the same layer and located between the planar electrode 1042 and the first substrate 101. In this case, electrical connection between the first lead 106 and the first strip-shaped electrodes 1031 may refer to FIGS. 24 and 26, and the second lead 107 may be in contact and electric connection with the planar electrode 1042. In addition, since resistance of the planar electrode 1042 itself is very small, there is no need to provide a second resistance reduction line 110, such that only a first resistance reduction line 109 integrally provided with the first strip-shaped electrodes 1031 may exist. In addition, arrangement modes of a first terminal 111 and a second terminal 112 may refer to FIGS. 24, 28 and 29, and arrangement modes of the liquid crystal layer 105, a first alignment layer 113 and a second alignment layer 114 may refer to the related contents of the dimmable panel shown in FIGS. 1 and 2, which will not be repeated herein.

In some embodiments, as shown in FIG. 31, the first lead 106 and the first strip-shaped electrodes 1031 may be integrally arranged in the same layer, the second lead 107 and the planar electrode 1042 may be integrally arranged in the same layer, and the first terminal 111 and the second terminal 112 may be arranged in the same layer as the first strip-shaped electrodes 1031.

Figure 33:
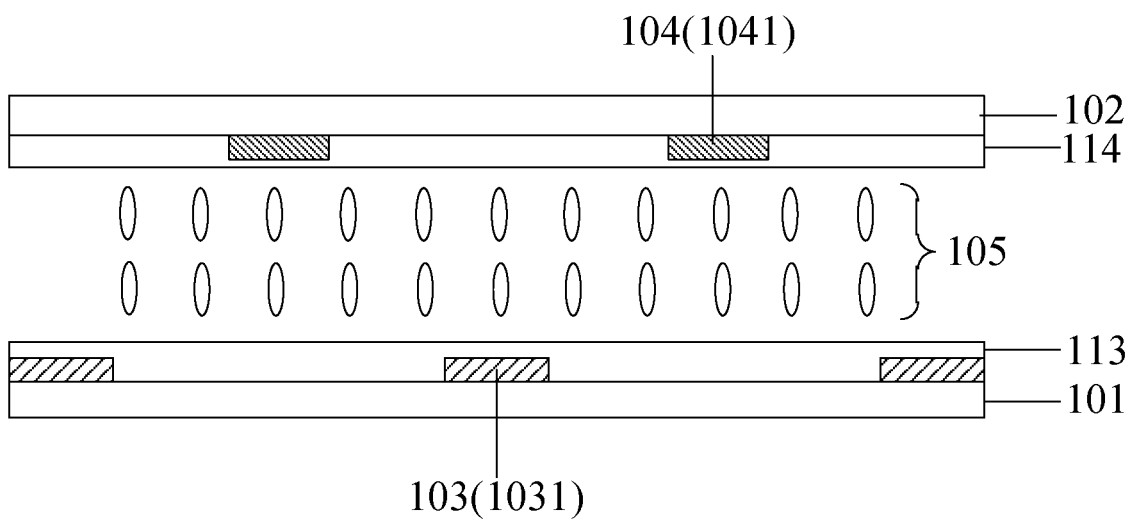
FIG. 33 shows another sectional view of a dimmable panel provided in embodiments of the present disclosure.

FIG. 33 shows another dimmable panel provided in the embodiments of the present disclosure. As shown in FIG. 33, in the dimmable panel provided in the embodiments of the present disclosure, a first electrode 103 is located at one side, facing a second substrate 102, of a first substrate 101; a second electrode 104 is located at one side, facing the first substrate 101, of the second substrate 102; and the first electrode 103 includes a plurality of first strip-shaped electrodes 1031 extending in a bent manner, the second electrode 104 includes a plurality of second strip-shaped electrodes 1041 extending in a bent manner, and orthographic projections of the second strip-shaped electrodes 1041 on the first substrate 101 and orthographic projections of the first strip-shaped electrodes 1031 on the first substrate 101 are arranged alternately. A principle of achieving switch between a peep-proof state in all viewing angles and a shared state of the dimmable panel shown in FIG. 33 may refer to the related contents of the dimmable panel shown in FIGS. 1 and 2, which will not be repeated herein.

In addition, in order to simplify a manufacturing process, a first lead 106, a first terminal 111 and the first strip-shaped electrodes 1031 may be arranged on the first substrate 101 and located in the same layer; and the first terminal 111, the first lead 106 and the first strip-shaped electrodes 1031 are integrally arranged. A second lead 107, a second terminal 112 and the second strip-shaped electrodes 1041 may be arranged on the second substrate 102 and located in the same layer; and the second terminal 112, the second lead 107 and the second strip-shaped electrodes 1041 are integrally arranged. In this case, there is no need to provide a first resistance reduction line 109 and a second resistance reduction line 110. Certainly, arrangement modes of the first lead 106 and the second lead 107 may also refer to FIGS. 24, 26 and 27, which will not be repeated herein. In addition, implementation of a liquid crystal layer 105, a first alignment layer 113 and a second alignment layer 114 in the dimmable panel shown in FIG. 33 may refer to the related contents of the dimmable panel shown in FIGS. 1 and 2, which will not be repeated herein.

It should be noted that the first terminal 111 electrically connected to the first lead 106 may be arranged in the same layer as the first strip-shaped electrodes 1031, and the second terminal 112 electrically connected to the second lead 107 may be arranged in the same layer as the second strip-shaped electrodes 1041. Optionally, the first terminal 111 is connected to one flexible printed circuit board, and the second terminal 112 is connected to another flexible printed circuit board; or, the first terminal 111 is connected to one flexible printed circuit board, and the second terminal 112 is connected to the same flexible printed circuit board as the first terminal 111 via conductive structures such as a golden ball, which is not limited herein.

Figure 34:
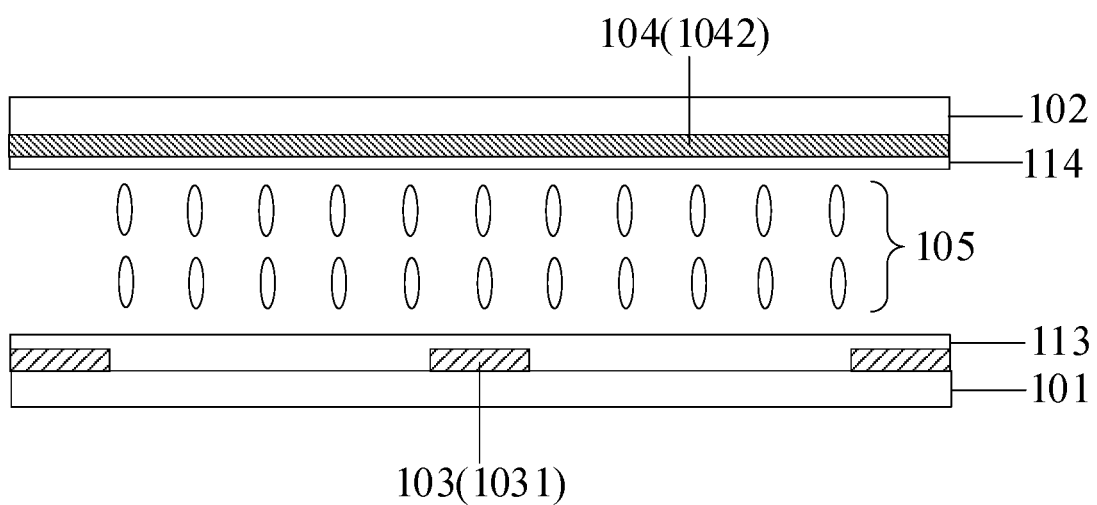
FIG. 34 shows another sectional view of a dimmable panel provided in embodiments of the present disclosure.

FIG. 34 shows a dimmable panel provided in the embodiments of the present disclosure. As shown in FIG. 34, in the dimmable panel provided in the embodiments of the present disclosure, a first electrode 103 is located at one side, facing a second substrate 102, of a first substrate 101; a second electrode 104 is located at one side, facing the first substrate 101, of the second substrate 102; and the first electrode 103 includes a plurality of first strip-shaped electrodes 1031 extending in a bent manner, and the second electrode 104 is a planar electrode 1042. A principle of achieving switch between a peep-proof state in all viewing angles and a shared state of the dimmable panel shown in FIG. 34 may refer to the related contents of the dimmable panel shown in FIGS. 30-32, which will not be repeated herein.

In addition, arrangement modes of a first lead 106, a second lead 107, a first terminal 111 and a second terminal 112 may refer to the dimmable panel shown in FIGS. 30-32; and implementation of a liquid crystal layer 105, a first alignment layer 113 and a second alignment layer 114 may refer to the related contents of the dimmable panel shown in FIGS. 1 and 2, which will not be repeated herein.

Figure 35:
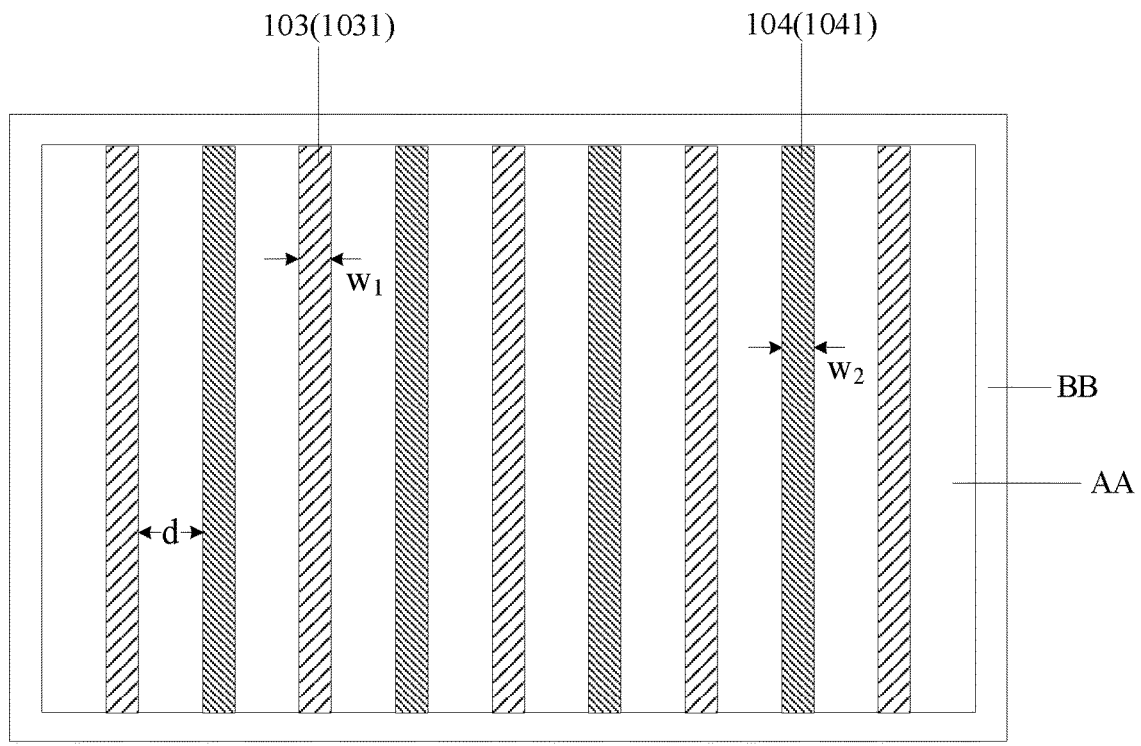
FIG. 35 shows another top view of a dimmable panel provided in embodiments of the present disclosure.

FIG. 35 shows a dimmable panel provided in the embodiments of the present disclosure. As shown in FIG. 35, in the dimmable panel provided in the embodiments of the present disclosure, first strip-shaped electrodes 1031 and second strip-shaped electrodes 1041 extend in a straight line, which is equivalent to replacing strip-shaped electrodes extending in a bent manner in the dimmable panels shown in FIGS. 1, 2, 14, 15, 18, 24 and 25 with strip-shaped electrodes extending in a straight line. Therefore, in the dimmable panel shown in FIG. 35, film layer positions of the first strip-shaped electrodes 1031 and the second strip-shaped electrodes 1041, and the corresponding first lead 106, second lead 107, first resistance reduction line 109, second resistance reduction line 110, first terminal 111 and second terminal 112, etc. may refer to the related contents of the dimmable panels shown in FIGS. 1, 2, 14, 15, 18, 24 and 25, which will not be repeated herein.

It should be noted that, in the dimmable panel shown in FIG. 35, when the first strip-shaped electrodes 1031 and the second strip-shaped electrodes 1041 extend in a straight line, compared with the situation that the first strip-shaped electrodes 1031 and the second strip-shaped electrodes 1041 extend in a bent manner, a principle of achieving a peep-proof state and a shared state is similar. The difference therebetween is that when the first strip-shaped electrodes 1031 and the second strip-shaped electrodes 1041 extend in a straight line, only switch between one-way peep-proof state and a shared state may be achieved; but when the first strip-shaped electrodes 1031 and the second strip-shaped electrodes 1041 extend in a bent manner, switch between a peep-proof state in all viewing angles and a shared state may be achieved.

In some embodiments, in order to achieve a better shared-state effect, as shown in FIG. 35, a line width $w_1$ of each first strip-shaped electrode 1031 extending in a straight line and a line width $w_2$ of each second strip-shaped electrode 1041 extending in a straight line may range from 1.5 µm to 8 µm, such as 1.5 µm, 2 µm, 3 µm, 4 µm, 5 µm, 6 µm, 7 µm, and 8 µm. Line distances d of the first strip-shaped electrodes 1031 and the second strip-shaped electrodes 1041 may range from 2 µm to 10 µm, such as 2 µm, 3 µm, 4 µm, 5 µm, 6 µm, 7 µm, 8 µm, 9 µm, and 10 µm.

Figure 36:
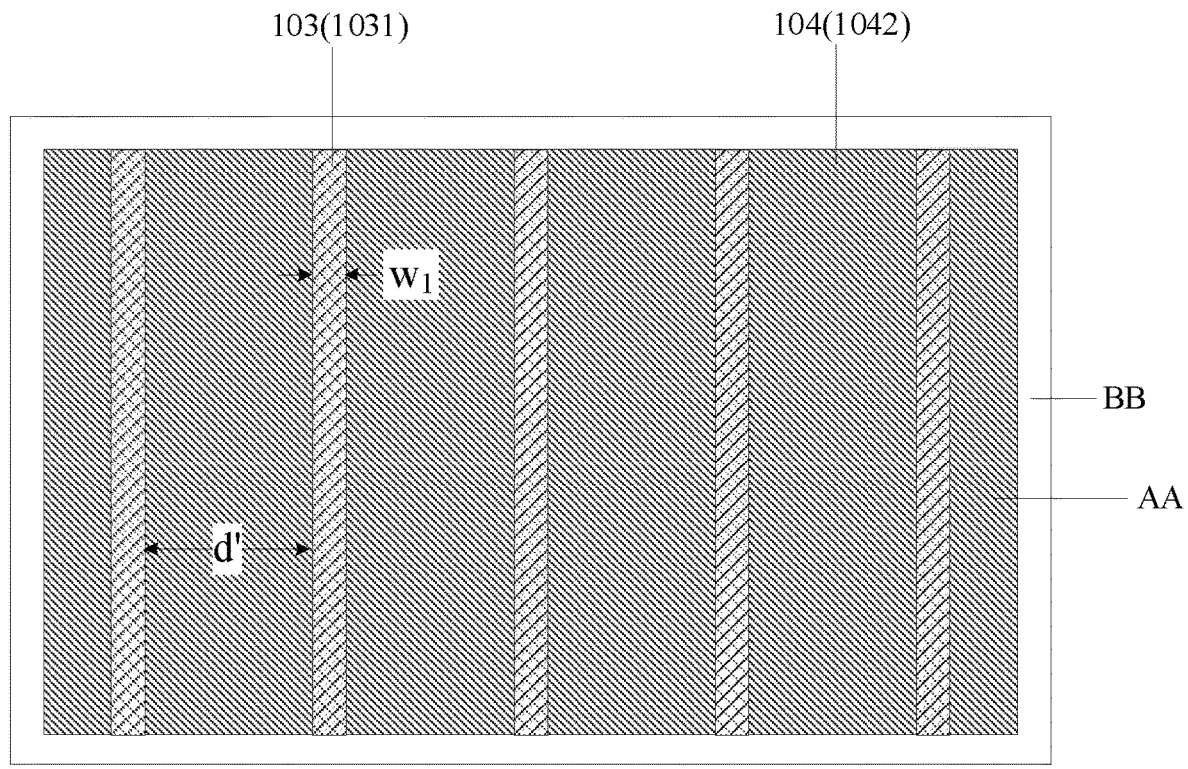
FIG. 36 shows another top view of a dimmable panel provided in embodiments of the present disclosure.

FIG. 36 shows a dimmable panel provided in the embodiments of the present disclosure. As shown in FIG. 36, in the dimmable panel provided in the embodiments of the present disclosure, a first electrode 103 includes a plurality of first strip-shaped electrodes 1031 extending in a straight line, and a second electrode 104 is a planar electrode 1042, which is equivalent to replacing the first strip-shaped electrodes 1031 extending in a bent manner in the dimmable panels shown in FIGS. 30-32 and 34 with the first strip-shaped electrodes 1031 extending in a straight line. Therefore, in the dimmable panel shown in FIG. 36, film layer positions of the first strip-shaped electrodes 1031 and the planar electrode 1042, and the corresponding first lead 106, second lead 107, first resistance reduction line 109, second resistance reduction line 110, first terminal 111 and second terminal 112, etc. may refer to the related contents of FIGS. 30-32 and 34, which will not be repeated herein.

It should be noted that, a principle of achieving switch between a peep-proof state and a shared state of the dimmable panel shown in FIG. 36 is similar to that of the dimmable panels shown in FIGS. 30-32 and 34, and a difference therebetween is that the dimmable panel shown in FIG. 36 may only achieve switch between one-way peep-proof state and a shared state, and the dimmable panels shown in FIGS. 30-32 and 34 may achieve switch between a peep-proof state in all viewing angles and a shared state.

In some embodiments, in order to achieve a better shared-state effect, as shown in FIG. 36, a line width $w_1$ of each first strip-shaped electrode 1031 extending in a straight line may range from 1.5 μm to 5 μm, such as 1.5 μm, 2 μm, 3 μm, 4 μm, and 5 μm. A line distance d' of adjacent first strip-shaped electrodes 1031 may range from 5 μm to 12 μm, such as 5 μm, 6 μm, 7 μm, 8 μm, 9 μm, 10 μm, 11 μm, and 12 μm.

Based on the same inventive concept, embodiments of the present disclosure provide a display device. The display device includes the dimmable panel provided in the embodiments of the present disclosure. Because the display device has a similar principle to solve problems to the dimmable panel, reference may be made to implementation of the dimmable panel provided in the embodiments of the present disclosure for implementation of the display device provided in the embodiments of the present disclosure, and repetitions will not be repeated herein.

Figure 37:
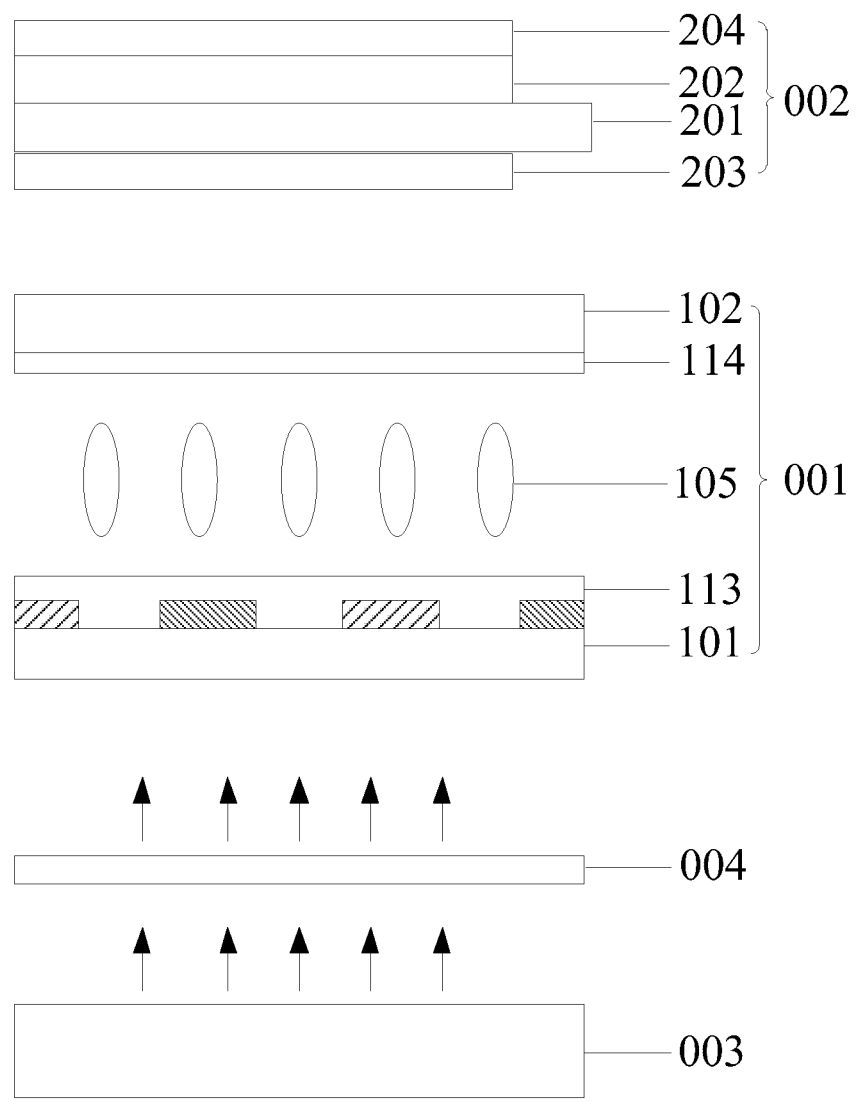
FIG. 37 shows a sectional view of a display device provided in embodiments of the present disclosure.
Figure 38:
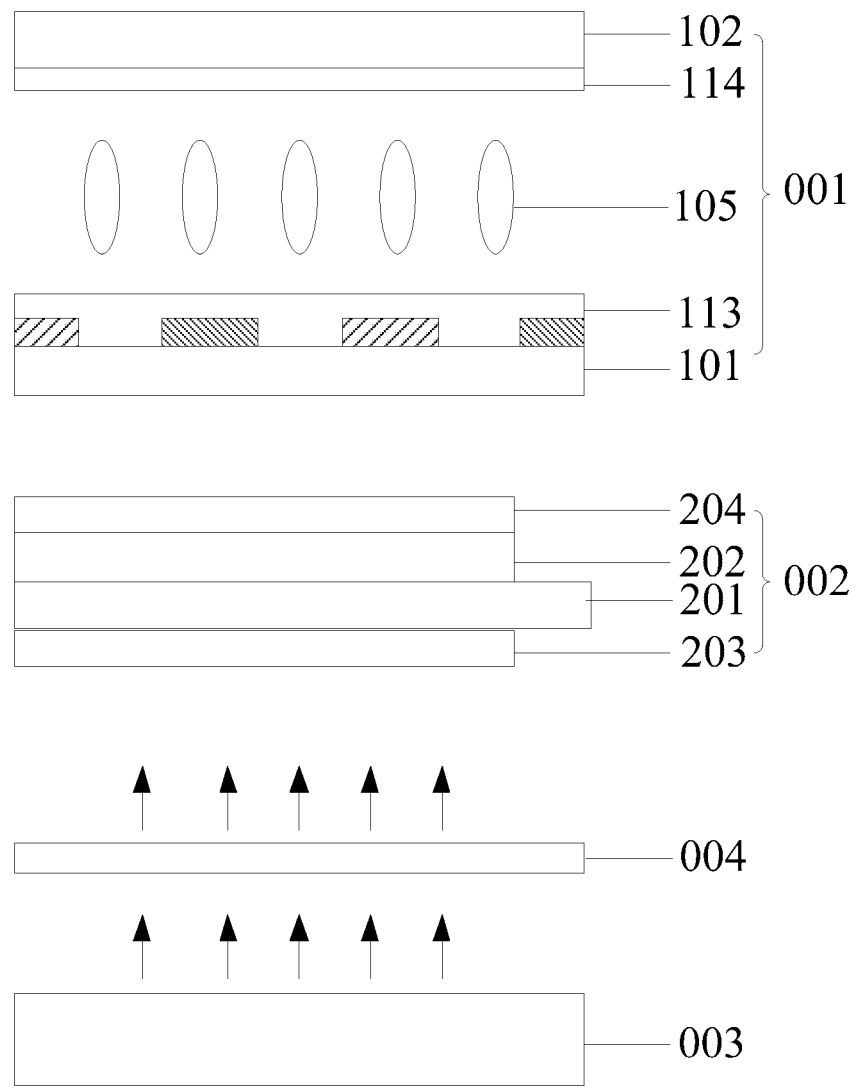
FIG. 38 shows another sectional view of a display device provided in embodiments of the present disclosure.

Specifically, as shown in FIGS. 37 and 38, the display device provided in the embodiments of the present disclosure includes a dimmable panel 001, a display panel 002, and a collimated backlight module 003, where the dimmable panel 001 is the above dimmable panel 001 provided in the embodiments of the present disclosure, and the dimmable panel 001 and the display panel 002 are arranged at a light emitting side of the collimated backlight module 003 in a laminated manner. Optionally, as shown in FIG. 37, the dimmable panel 001 and the display panel 002 are sequentially arranged at the light emitting side of the collimated backlight module 003; and as shown in FIG. 38, the display panel 002 and the dimmable panel 001 are sequentially arranged at the light emitting side of the collimated backlight module 003. In some embodiments, as shown in FIGS. 37 and 38, the display panel 002 may include a display substrate 201 and an opposing substrate 202 that are arranged opposite each other; a first polarizer 203 located at one side, away from the opposing substrate 202, of the display substrate 201; and a second polarizer 204 located at one side, away from the display substrate 201, of the opposing substrate 202.

In some embodiments, as shown in FIGS. 37 and 38, the display device provided in the embodiments of the present disclosure may further include a peep-proof protective film VCF 004, where the peep-proof protective film 004 is located between the light emitting side of the collimated backlight module 003 and a laminate of the dimmable panel 001 and the display panel 002, such that a collimation degree of collimated light emitted from the collimated backlight module 003 may be further improved. Optionally, the peep-proof protective film 004 is arranged in a louver structure by using black materials. During a specific embodiment, two layers of peep-proof protective films 004 may be superimposed, there is a certain included angle between the two layers of peep-proof protective films 004, and the included angle may range from 45° to 90°, for example, the included angle between the two layers of peep-proof protective films 004 may be 45°, 60°, 90°, etc.

In some embodiments, the display device provided in the embodiments of the present disclosure can be any product or component having a display function, such as a mobile phone, a tablet computer, a television, a display, a notebook computer, a digital photo frame, a navigator, a smart watch, a fitness wristband, and a personal digital assistant. The display device includes, but is not limited to, a radio frequency unit, a network module, an audio output/input unit, a sensor, a user input unit, an interface unit, a memory, a processor, a power supply, etc. In addition, it can be understood by those skilled in the art that the above structure does not constitute a limitation on the display device provided in the embodiments of the present disclosure, that is, the display device provided in the embodiments of the present disclosure may include more or fewer components described above, some of the components can be combined, or the components can be arranged in different ways.

Apparently, those skilled in the art can make various modifications and variations to the examples of the present disclosure without departing from the spirit and scope of the embodiments of the present disclosure. In this way, if the modifications and variations of the embodiments of the present disclosure fall within the scope of the claims of the present disclosure and their equivalent technologies, the present disclosure is also intended to include the modifications and variations.

What is claimed is:

1. A display panel with switchable viewing angle, having a dimmable area and comprising:
   a first substrate and a second substrate which are disposed opposite each other;
   a first electrode and a second electrode which are insulated from each other and disposed between the first substrate and the second substrate, wherein the first electrode and the second electrode are disposed in the dimmable area, at least one of the first electrode and the second electrode comprises a plurality of strip-shaped electrodes, extension trends of the plurality of strip-shaped electrodes are approximately same, and orthographic projections of the plurality of strip-shaped electrodes on the first substrate do not overlap each other; and
   a liquid crystal layer disposed between the first substrate and the second substrate, wherein the liquid crystal layer is disposed in the dimmable area;
   wherein the first electrode comprises a plurality of first strip-shaped electrodes; the second electrode comprises a plurality of second strip-shaped electrodes; and orthographic projections of the plurality of second strip-shaped electrodes on the first substrate and orthographic projections of the plurality of first strip-shaped electrodes on the first substrate are arranged alternately; or, the first electrode comprises a plurality of first strip-shaped electrodes, and the second electrode is a planar electrode;

wherein the display panel further comprises a peripheral area surrounding the dimmable area; wherein a first lead and a second lead are disposed in the peripheral area; and the first lead is electrically connected to at least one end of each of the plurality of first strip-shaped electrodes; wherein the second lead is electrically connected to at least one end of each of the plurality of second strip-shaped electrodes, or, the second lead is electrically connected to the second electrode as the planar electrode;

wherein the peripheral area comprises a first peripheral area for bonding a circuit board, and a first terminal and a second terminal are disposed in the first peripheral area; wherein the first terminal is connected to the first lead and the circuit board, and the second terminal is connected to the second lead and the circuit board; the first terminal is disposed in a same layer as an electrode which is farthest from a substrate where the first terminal is disposed; and the second terminal is disposed in a same layer as an electrode which is farthest from a substrate where the second terminal is disposed.

2. The display panel according to claim 1, wherein shapes of the plurality of first strip-shaped electrodes are approximately same as those of the plurality of second strip-shaped electrodes.

3. The display panel according to claim 1, wherein the plurality of first strip-shaped electrodes extend in a bent manner;

wherein each of the first strip-shaped electrodes comprises a plurality of sub-electrodes connected in sequence, and the plurality of sub-electrodes are S-shaped and/or zigzag.

4. The display panel according to claim 1, wherein the plurality of first strip-shaped electrodes extend in a straight line.

5. The display panel according to claim 1, wherein the peripheral area comprises a first peripheral area for bonding a circuit board, and the first peripheral area is located at one side of the first strip-shaped electrodes in an arrangement direction; and the first lead is electrically connected to an end, close to the first peripheral area, of each of the first strip-shaped electrodes; and the second lead is electrically connected to an end, away from the first peripheral area, of each of the second strip-shaped electrodes.

6. The display panel according to claim 1, wherein the first lead is electrically connected to two ends of each of the plurality of first strip-shaped electrodes, and the second lead is electrically connected to two ends of each of the plurality of the second strip-shaped electrodes.

7. The display panel according to claim 1, wherein the first electrode and the second electrode are disposed in a same layer on the first substrate.

8. The display panel according to claim 7, wherein the first lead and the second lead are disposed in the same layer, and the first lead and the second lead are disposed between a layer where the first electrode is disposed and the first substrate;

the dimmable panel further comprises a first insulation layer between the layer where the first electrode is disposed and a layer where the first lead is disposed, and the first insulation layer comprises a first via hole and a second via hole that are disposed in the peripheral area;

an orthographic projection of the first via hole on the first substrate is disposed in an orthographic projection of the first lead on the first substrate, and the first lead is electrically connected to the plurality of first strip-shaped electrodes via the first via hole; and an orthographic projection of the second via hole on the first substrate is disposed in an orthographic projection of the second lead on the first substrate, and the second lead is electrically connected to the plurality of second strip-shaped electrodes via the second via hole.

9. The display panel according to claim 8, further comprising a first resistance reduction line and a second resistance reduction line that are disposed in the peripheral area;

wherein the first resistance reduction line and the first electrode are integrally disposed in a same layer, and the second resistance reduction line and the second electrode are integrally disposed in a same layer.

10. The display panel according to claim 7, wherein the first lead and the plurality of first strip-shaped electrodes are integrally disposed, and the second lead and the plurality of second electrode are integrally disposed.

11. The display panel according to claim 1, wherein the first electrode is disposed at one side, facing the second substrate, of the first substrate; and a layer where the second electrode is disposed is disposed between the layer where the first electrode is disposed and the first substrate.

12. The display panel according to claim 11, wherein the first lead and the second lead are disposed in a same layer, and the first lead and the second lead are disposed between the layer where the second electrode is disposed and the first substrate;

wherein the dimmable panel further comprises a second insulation layer between the layer where the first electrode is disposed and the layer where the second electrode is disposed;

the second insulation layer comprises a third via hole disposed in the peripheral area, and an orthographic projection of the third via hole on the first substrate is disposed in an orthographic projection of the first lead on the first substrate; and the first lead is electrically connected to the plurality of first strip-shaped electrodes via the third via hole, and the second lead is in contact and electric connection with the second electrode.

13. The display panel according to claim 1, wherein the first electrode is disposed at one side, facing the second substrate, of the first substrate; and the second electrode is disposed at one side, facing the first substrate, of the second substrate.

14. The display panel according to claim 13, wherein the first lead is disposed between a layer where the first electrode is disposed and the first substrate, and the first lead is in contact and electric connection with the plurality of first strip-shaped electrodes; and the second lead is disposed between a layer where the second electrode is disposed and the second substrate, and the second lead is in contact and electric connection with the plurality of second strip-shaped electrodes.

15. A display device, comprising:
a collimated backlight module, and
the display panel according to claim 1,
wherein the display panel is disposed at a light emitting side of the collimated backlight module;
wherein the display device further comprises a peep-proof protective film, wherein the peep-proof protective film is disposed between a light emitting side of the collimated backlight module and the display panel.

* * * * *